(12) United States Patent
Jalan

(10) Patent No.: US 10,474,899 B2
(45) Date of Patent: Nov. 12, 2019

(54) SOCIAL ENGAGEMENT BASED ON IMAGE RESEMBLANCE

(71) Applicant: Facebook, Inc., Menlo Park, CA (US)

(72) Inventor: Shivani Jalan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 99 days.

(21) Appl. No.: 15/477,839

(22) Filed: Apr. 3, 2017

(65) Prior Publication Data

US 2018/0285646 A1   Oct. 4, 2018

(51) Int. Cl.
*G06K 9/00* (2006.01)
*G06Q 50/00* (2012.01)
*G06F 16/583* (2019.01)

(52) U.S. Cl.
CPC ......... *G06K 9/00677* (2013.01); *G06Q 50/01* (2013.01); *G06F 16/5838* (2019.01); *G06K 9/00268* (2013.01); *G06K 9/00288* (2013.01)

(58) Field of Classification Search
None
See application file for complete search history.

(56) References Cited

U.S. PATENT DOCUMENTS

| | | | | |
|---|---|---|---|---|
| 7,907,755 B1* | 3/2011 | Perlmutter | ......... | G06K 9/00288 382/118 |
| 8,369,570 B2* | 2/2013 | Myers | ................ | G06K 9/00221 382/103 |
| 2010/0266167 A1* | 10/2010 | Kodesh | .............. | G06K 9/00288 382/118 |
| 2012/0155717 A1* | 6/2012 | Ma | .................... | G06F 17/30259 382/118 |
| 2013/0156274 A1* | 6/2013 | Buchmueller | ....... | G06Q 10/101 382/118 |
| 2014/0025707 A1* | 1/2014 | Sivaraman | ........ | G06F 17/30277 707/772 |

OTHER PUBLICATIONS

M. Turk, and A. Pentland, "Face Recognition Using Eigenfaces," Proc. IEEE Conf. on Computer Vision and Pattern Recognition, 1991, pp. 586-591 (Year: 1991).*

* cited by examiner

*Primary Examiner* — Justin P. Misleh
(74) *Attorney, Agent, or Firm* — Keller Jolley Preece

(57) ABSTRACT

The present disclosure is directed toward systems and methods for identifying and providing a user of a networking system with other users of the networking system that have a facial resemblance to the user (e.g., look-alike users). In particular, a facial resemblance system uses an image of a user to identify other users that have a facial resemblance to the user (e.g., look-alike users). The facial resemblance system can present look-alike users to the user based on a resemblance score and/or a commonality score. Further, the facial resemblance system can employ feedback from users to improve the accuracy of the facial resemblance system. Upon receiving one or more look-alike users, the user can then engage (e.g., communicate or socially connect) with one or more of the look-alike users.

20 Claims, 11 Drawing Sheets

SOCIAL ENGAGEMENT BASED ON IMAGE RESEMBLANCE

BACKGROUND

Through advancements in computing devices and computing technology, individuals can easily connect with and communicate with other individuals. Indeed, through modern computing devices and systems, individuals have access to many forms of digital communication that allow them to communicate with people across the world (e.g., through a social network). Once connected, various conventional communication systems allow an individual to communicate with an audience of users by, for example, sharing a post, updating a status, sending a message, or sharing a picture or video. While many conventional systems are effective in allowing users to connect and communicate with an audience, these conventional systems have various disadvantages.

As one example, conventional systems could improve the manner of how a user finds and discovers other users with whom to connect or communicate. To demonstrate, many conventional systems provide recommendations of other users with whom a user could potentially connect. As part of providing these recommendations, conventional communication systems often identify potential connections based on shared attributes between the user and a potential connection. However, before a conventional system can identify and analyze shared attributes of users, each user must often provide the system with multiple pieces of user profile information (e.g., connections, demographic information, personal information, interests, etc.). For example, a conventional system compares profile information between the user and potential connections to identify common attributes. Thus, as one shortcoming, conventional systems require users to first provide various pieces of information and/or use the social networking system for a period of time before the system can begin to identify and recommend potential connections As another shortcoming, the recommendation quality of potential connections varies based on the amount and type of information provided by the user (as well as the other users). Indeed, even with established users who have provided substantial amounts of information, because users are subjective in their preferences, conventional systems often identify potential connections with whom users do not want to connect and view as low-quality or undesirable connections.

As an additional shortcoming, the process of correlating various pieces of information between users to determine potential connections for a user is complex and resource intensive. For example, conventional systems attempt to correlate, factor, regress, and weight information provided by multiple users of a social networking system to determine how compatible users are to each other as part of the recommendation process. Occasionally, users provide subjective and/or misleading information, which further distorts the process of identifying quality potential connections.

Accordingly, these and several other disadvantages, shortcomings, and drawbacks exist with regard to conventional systems.

SUMMARY

Embodiments described herein provide benefits and/or solve one or more of the foregoing or other problems in the art by employing systems and methods that provide look-alike users to a user of a networking system (e.g., a social networking system or messaging system) using minimal, objective user input. As described in detail below, the disclosed systems and methods identify look-alike users that have a physical resemblance to the user. In this manner, a user of a networking system can connect with other users that look like the user.

To illustrate, in one or more embodiments, the disclosed system maintains a collection of images of users belonging to a networking system. For example, each image in the collection includes facial features of the users. Based on a user of the networking system providing an image, the disclosed system identifies images of other users from the collection of images that have a facial resemblance to the user, called look-alike users. The disclosed system then presents, to the user, the look-alike users as well as engagement options for the user to connect or communicate with the look-alike users.

In addition, the disclosed systems and methods, in some embodiments, filter out images in the collection that clearly do not have a facial resemblance to the user. For example, the disclosed systems and methods use metadata derived from each image and/or facial feature to filter out images. Filtering down the number of images that involve detailed comparisons to a user's image reduces the amount of computing resources needed by the disclosed systems and methods when performing image processing (i.e., performing image comparisons). Further, reducing the number of images becomes particularly beneficial when the collection of images includes millions or even billions of images (including videos).

Additional features and advantages of the present application will be set forth in the description which follows, and in part will be obvious from the description, or may be learned by the practice of such example embodiments.

BRIEF DESCRIPTION OF THE DRAWINGS

To better describe the manner in which the systems and methods obtain the advantages and features of the disclosed embodiments, a number of example embodiments are described in connection with accompanying drawings. The following paragraphs briefly describe those figures.

DETAILED DESCRIPTION

Figure 1:
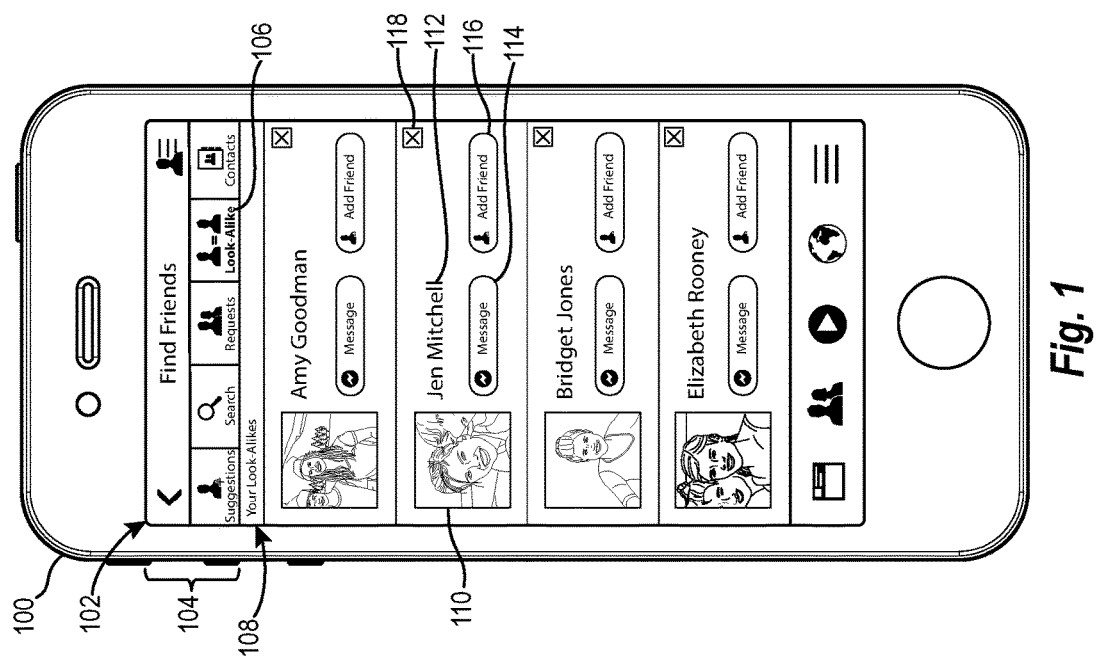
FIG. 1 illustrates an example graphical user interface view on a client device of providing look-alike users to a user of a networking system in accordance with one or more embodiments described herein.

The embodiments disclosed herein describe a facial resemblance system that provides a user of a networking system (e.g., a social networking system or electronic messaging system) with other users of the networking system with whom the user can engage (e.g., message or connect). More specifically, the facial resemblance system recommends one or more other users to a user based on the one or more other users having a physical resemblance to the user (e.g., a look-alike user), despite not having a traditional social connection to the user. In particular, the facial resemblance system uses image feature recognition to determine look-alike users.

A primary objective of providing look-alike users to a user is to encourage the user to connect with other users, which relies on the human tendency to associate with others that have a similar appearance. Conventional systems attempt to achieve this goal by identifying other users that appear to be similar to the user. As mentioned above, conventional systems employ complex processes that attempt to correlate various pieces of information between users to determine other users with whom a user should connect.

In contrast, the disclosed facial resemblance system accurately identifies other users look who like the user, based on simple and objective data. Individuals have a natural affinity towards people that look like them. Furthermore, individuals have a natural tendency to be associated with others. Accordingly, individuals feel the propensity to communicate and connect with other individuals that look like them. As one explanation for this phenomenon, when an individual views another individual that has the same attributes, the individual sees a reflection of him or herself, which triggers an instinctual connection, even with complete strangers.

To illustrate how the facial resemblance system provides improvements over conventional systems and methods, in one or more embodiments, the facial resemblance system maintains a collection of images associated with users of a networking system. In general, each image in the collection of images includes one or more facial features of a user. As used herein, the term "facial feature" refers to a distinct region and/or feature of a human face that the facial resemblance system can analyze and compare to the regions and/or features of the faces of others. As one example, a facial feature includes a physical trait or characteristic of a human face. As another example, a facial feature includes specific structures in the image such as points, edges, or sections that correspond to a user's face. In some instances, facial features are represented using graphical and/or mathematical representations. For instance, the facial resemblance system employs a facial attribute data vector to represent a facial feature. The term, "facial resemblance," as used herein generally refers to two or more faces having one or more features that have a similarity or likeness to each other, either observationally or mathematically.

As part of providing a user of a networking system with look-alike users with whom the user can engage, the facial resemblance system first identifies an image of the user, including facial features within the image. Using the image, the facial resemblance system identifies images of other users from the collection of images having a facial resemblance to the user. In some embodiments, the facial resemblance system employs various recognition algorithms and/or machine learning to identify other images that have a facial resemblance with the user.

Upon identifying other users from the collection of images that look similar to the user, the facial resemblance system presents the identified look-alike users to the user. For example, the facial resemblance system provides the look-alike users to a user client device associated with the user. Further, in connection with providing the look-alike users, the facial resemblance system enables the user to engage with each look-alike user. For instance, the facial resemblance system provides options for the user to communicate or connect with a look-alike user.

In some embodiments, the facial resemblance system computes a resemblance score between the user's image and images of other users from the collection of images. For example, the facial resemblance system determines that another user (i.e., the image of the other user) has a facial resemblance with the user when the pair has a resemblance score above a threshold level or value. In various embodiments, the facial resemblance system organizes the presentation of look-alike users based on resemblance score when presenting them to the user.

As an alternative, after identifying look-alike users, the facial resemblance system uses a commonality score to organize the presentation of look-alike users. For example, the facial resemblance system determines a social-graph affinity (described below) between the user and each identified look-alike user. Then, based on each look-alike user's commonality score, the facial resemblance system organizes and presents the look-alike users to the user. In this manner, the facial resemblance system may prioritize look-alike users that have more in common with the user above look-alike users that have a higher resemblance score.

In cases where the collection of images is voluminous, the facial resemblance system can perform facial resemblance recognition with a subset of the collection. To illustrate, in one or more embodiments, the facial resemblance system uses classifications, labels, or other identifiers (e.g., metadata) to preliminarily filter out images in the collection that have a low probability of having a facial resemblance to the user. For example, if the image of the user has a classification of "long hair," the facial resemblance system filters out images in the collection with the classification of "bald" or "no hair."

By filtering out images and reducing the number of potential similar images in the collection, the facial resemblance system reduces the number of images that are analyzed against the image of the user. As the facial resemblance system applies additional filters, the number of potential similar images in the collection further decreases, which reduces computational resources needed to compare facial features and determine which images have a facial resemblance to the user.

As mentioned above, the facial resemblance system can use metadata to reduce the searchable size of the collection of images. In some embodiments, the facial resemblance system derives metadata from the images themselves. For example, the facial resemblance system uses image processing methods and techniques to detect various facial features and attributes of the user from the image, as described below.

In some embodiments, the facial resemblance system identifies and/or generates a subset of images using external metadata, which is metadata that is not derived from the images themselves. For example, the facial resemblance system identifies one or more common attributes with the image of the user based on external metadata. Examples of external metadata include user-provided data (e.g., user-provided tags, categories, classifications, or descriptions), image-creation attributes (e.g., time, date, and/or location information associated with when/where the image was captured), or any other metadata not derived from the content of the image. To illustrate, the facial resemblance system can utilize external metadata to determine that a candidate user is within a threshold age range as the user, and thus, more likely to be a look-alike user to the user. As another example, the facial resemblance system identifies, from external metadata, all images taken in a particular region as the user (and/or excludes images not taken in the region) to create the reduced subset of images.

Along with providing look-alike users to a user, in one or more embodiments, the facial resemblance system enables a user to validate the accuracy of a look-alike user. For example, the facial resemblance system enables the user to indicate whether a look-alike user "looks like me" or "does not look like me." In some embodiments, the facial resemblance system allows a user to rank or score how accurately a look-alike user is to the user. The facial resemblance system can use the validation to retrain, relearn, and provide improved look-alike users to the user (and other users). For example, the facial resemblance system retrains or updates a machine learning model associated with the user based on the user validation, which the facial resemblance system then uses in the future to identifier more accurate look-alike users.

As mentioned above, the facial resemblance system provides numerous advantages and benefits over conventional systems and methods. For example, the facial resemblance system identifies and recommends look-alike users to users of a networking system based on a single user input. Further, the facial resemblance system obtains these results in an objective manner, that is unbiased by subjective, erroneous, false, or misleading user input. In addition, the facial resemblance system can employ user feedback and validation to improve and provide increasingly accurate results to users. Further, the facial resemblance system intelligently operates in a manner that improves computer functionality when dealing with large datasets. Overall, the facial resemblance system provides a number of advantages and benefits while, at the same time, producing high-quality look-alike users to users of a networking system such as a social networking system or other communication system.

Additional advantages and benefits will become evident as illustrative embodiments are described in connection with the figures. As an overview, FIG. 1 illustrates a client device 100 having a graphical user interface 102 that displays look-alike users 108 to a user of a networking system (e.g., the user associated with the client device 100) within a client application such as a networking application. As such, the graphical user interface 102 displays a user interface of a networking system that presents various options to a user to discover and connect with other users of the networking system. While not shown, the graphical user interface 102 can also display other features and services of the networking system, such as wall posts, photo-sharing, online calendars and event organization, messaging, games, or advertisements, as described in detail below.

As shown in the illustrative embodiment of FIG. 1, the graphical user interface 102 also includes a discovery header 104 that includes selectable categories that enable the networking system to present the user with various discovery categories. As further shown, the user selected the look-alike category 106 within the discovery header 104. Upon selecting the look-alike category 106, the facial resemblance system presents one or more look-alike users 108 to the user.

While the graphical user interface 102 includes look-alike users 108 upon a user selecting a look-alike category 106, one will appreciate that the facial resemblance system can present look-alike users to the user in other contexts. As an example, the facial resemblance system presents one or more look-alike users among posts on the user's wall. As another example, the facial resemblance system provides a notification that includes one or more look-alike users.

As shown in FIG. 1, each of the look-alike users 108 includes an image 110 and a name 112 of the look-alike user. In one or more embodiments, such as the illustrative embodiment, each look-alike user includes a messaging option 114 that enables the user of the client device 100 to communicate with the look-alike user. For example, upon the user selecting the messaging option 114, the facial resemblance system, in connection with the networking system, directs the user to a messaging user interface that enables the user to message the selected look-alike user. In some embodiments, the facial resemblance system can pre-populate one or more messages for the user to send to the selected look-alike user (e.g., "Hey, are you my long-lost twin?" or "I think we look a lot alike—I wonder what else we have in common?"). In further embodiments, the facial resemblance system can provide images of the user and the selected look-alike user within a message.

In addition to the messaging option 114, each look-alike user includes a connection option 116 that enables the user to connect with the selected look-alike user. Upon the user selecting the connection option 116, the facial resemblance system sends a connection request (e.g., a "friend request") to the selected look-alike user. In various embodiments, the facial resemblance system includes additional context within the connection request. For example, the connection request includes an image of the user and the selected look-alike user and indicates that the user would like to connect with the look-alike user based on the users looking similar to each other.

Each look-alike user can also include additional selectable options. For example, a removal option 118, when selected by the user, hides the selected look-alike user from the list of look-alike users 108. As another example, in connection with each look-alike user, the graphical user interface 102 includes options that indicate whether the selected look-alike user looks like the user or how similar the selected look-alike user is to the user, as further described below in connection with FIGS. 4A-4B. In other examples, the graphical user interface 102 includes options to compare the image 110 of a look-alike user next an image of the user (e.g., triggered by the user selecting the image 110 of a selected look-alike user).

In some embodiments, the graphical user interface 102 includes a settings option that enables the user to set privacy settings with respect to look-alike users. For instance, the user can opt-in or opt-out of being considered as a look-alike user to other users of the networking system. In some instances, both the user and a selected look-alike user must agree that each user looks like each other before the facial resemblance system enables the option for users to engage (e.g., message or connect) with each other. One will appreciate that additional privacy settings are possible, as described further below.

In addition, as shown in the discovery header 104, the look-alike category 106 is separate from other discovery categories. In one or more embodiments, the look-alike category 106 is separate from other discovery categories because the facial recognition system employs different processes for identifying recommended users in the different discovery categories. For example, the facial resemblance system provides both the conventional friends suggestions and as well as look-alike users.

As additionally described below, in many embodiments, the look-alike category 106 recommends a list of look-alike users 108 based primarily on the look-alike users 108 having a resemblance to the user. In other words, the visual similarity between the user and other users recommended as look-alike users is the primary (e.g., above 80%), if not the sole, factor considered when suggesting look-alike users. As such, the list of look-alike users 108 often includes other users that have little or nothing in common with the user other than their visual similarity and would not qualify to be included in the standard list of suggested friends.

Figure 2:
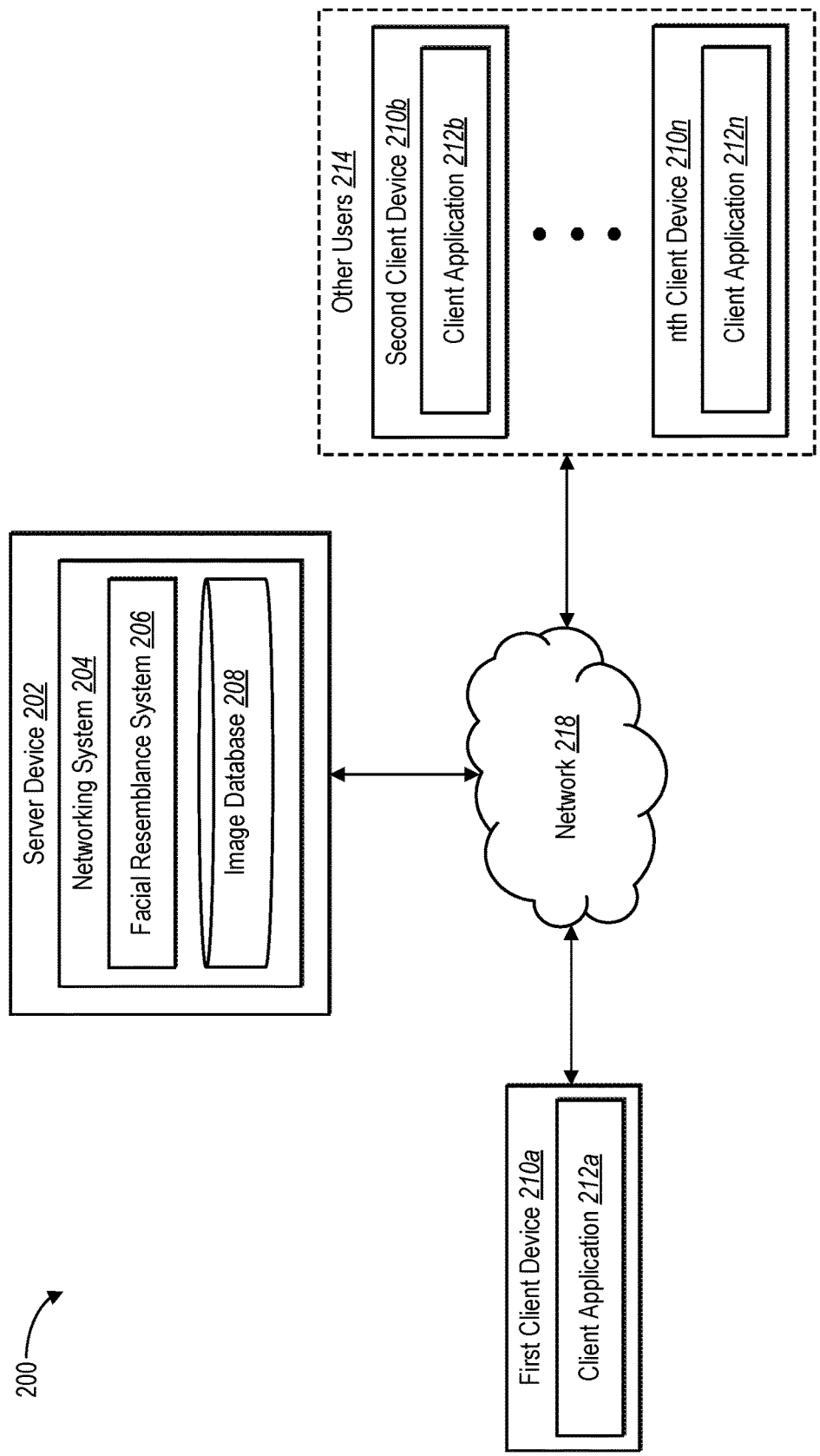
FIG. 2 illustrates an example embodiment of a communications environment in which the facial resemblance system operates in accordance with one or more embodiments described herein.

FIG. 1 provides a general overview of presenting look-alike users to a user of a networking system. Subsequent figures provide additional context, detail, and illustrations of how the facial resemblance system identifies and provides look-alike users to users of a networking system. To illustrate, FIG. 2 shows an example embodiment of a communications environment 200 in which a facial resemblance system 206 operates.

As shown, the communications environment 200 includes the facial resemblance system 206 and enables operation of one or more example embodiments of the facial resemblance system 206. As illustrated, the facial resemblance system 206 operates within a networking system 204 on a server device 202. In one or more embodiments, the facial resemblance system 206 and/or networking system 204 operates on multiple server devices. In some example embodiments, the facial resemblance system 206 is separate from the networking system 204, such as on one or more separate server devices or part of a different networking system (not illustrated).

The networking system 204 connects users together via various interests, people connections, and groups. For example, the networking system 204 is a social networking system that enables a user to post experiences, opinions, and curiosities with selective connections or the public at large. As another example, the networking system 204 is an electronic messaging system that enables users to communicate with each other, including sending messages, images, audio clips, and documents between each other. Additional information regarding the networking system 204 as a social networking system and/or an electronic messaging system is provided below in connection with FIGS. 10-11.

As shown in the illustrative embodiment, the networking system includes the facial resemblance system 206 and an image database 208. In general, the facial resemblance system 206 identifies look-alike users and enables a user to engage with the look-alike users. In particular, the facial resemblance system 206 analyzes images of users of the networking system 204 to identify and compare facial features between images to determine if other users have a facial resemblance to a particular user. As a note, because the facial resemblance system 206 resides on the networking system 204, connections, preferences, and permissions set by a user on the networking system 204 can carry over to and/or are accessible by the facial resemblance system 206. The facial resemblance system is comprehensively described in connection with the below figures.

The image database 208 stores images on users of the networking system 204 used by the facial resemblance system 206 to identify look-alike users. The image database 208, in one or more embodiments, includes one or more images of users of the networking system 204. In some embodiments, the image database 208 includes video or other media from which the facial resemblance system 206 can obtain or extract images of users. As described below, the networking system 204 and/or facial resemblance system 206 can organize (e.g., sort, label, classify, etc.) images in the image database 208 in a variety of ways.

The communications environment 200 also includes various client devices. As illustrated, the communications environment 200 includes a first client device 210a, a second client device 210b, and an nth client device 210n. The first client device 210a (e.g., user client device) is associated with a user of the networking system 204. The second client device 210b through the nth client device 210n (e.g., other client devices) are associated with other users 214 of the networking system 204.

Each client device, as shown, includes a client application 212a-n. In general, the client application provides access to the networking system 204 and the facial resemblance system 206. For example, the client application is a social networking client application and a user interacts with the client application 212a on the first client device 210a to engage with the other users 214 of the networking system 204, and vise-versa.

As shown, the server device 202 and various client devices communicate via a network 218. Additionally, although FIG. 2 illustrates a particular arrangement of the various components within the communications environment 200, other arrangements are possible. For example, the image database 208 may be located outside of the networking system 204. Further, while the communications environment 200 displays a single first client device 210a (e.g., user client device), one will appreciate that the communications environment 200 can include any number of user client devices. Additional details regarding the various computing devices and networks are explained below with respect to FIG. 9.

Figure 3:
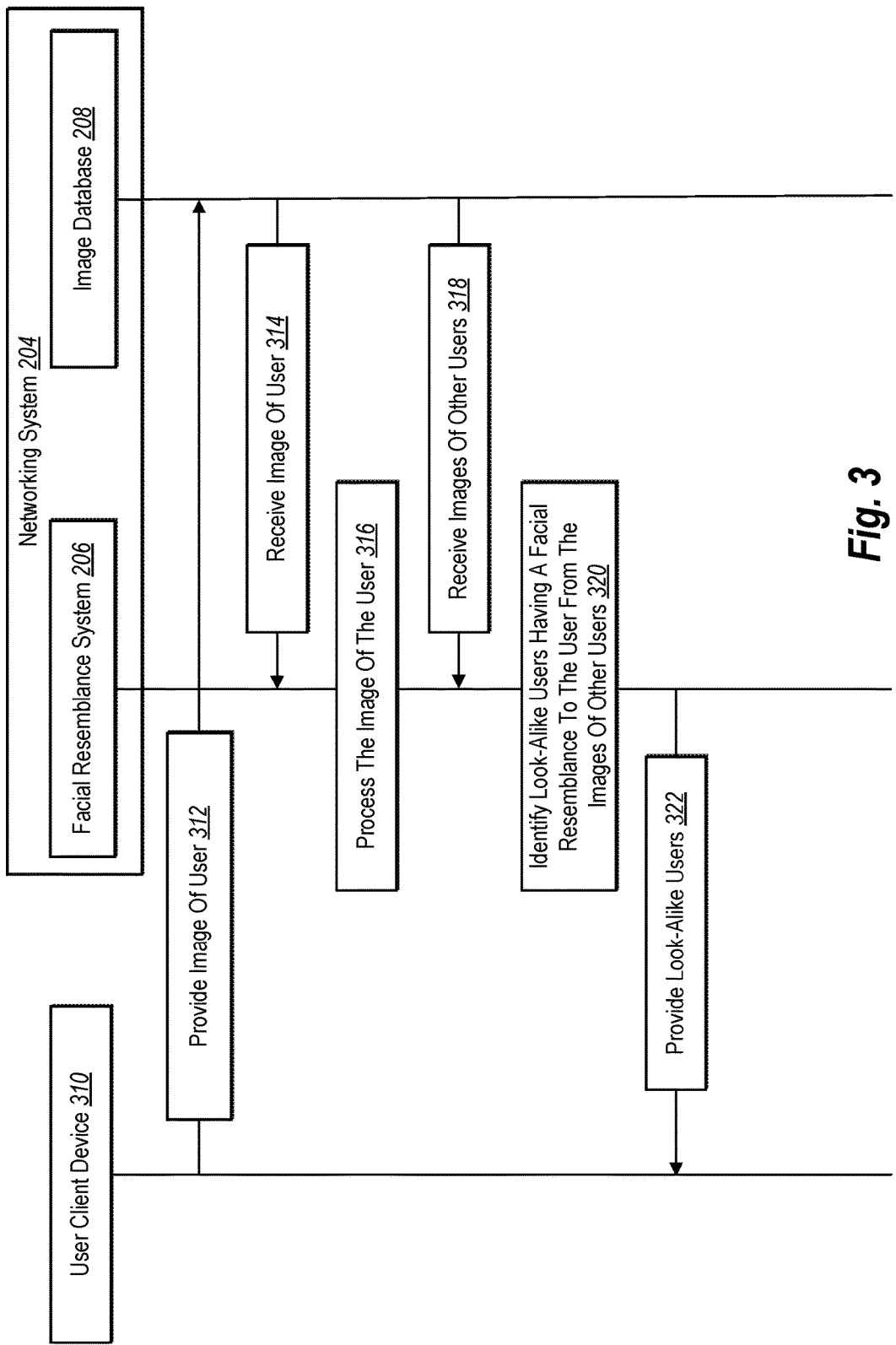
FIG. 3 illustrates a sequence diagram of determining one or more look-alike users to a user of a networking system in accordance with one or more embodiments described herein.

FIG. 3 illustrates a sequence diagram of determining one or more look-alike users to a user of a networking system. As illustrated, FIG. 3 includes the networking system 204, the facial resemblance system 206, and the image database 208 described above. In addition, FIG. 3 includes a user client device 310. The user client device 310 can represent one or more embodiments of the first client device 210a described above.

Initially, the user client device 310 provides 312 an image of the user to the networking system 204. For example, a camera on the user client device 310 captures a digital image of the user, which the user client device 310 sends to the networking system 204 (e.g., to use as a profile picture). In some embodiments, a user provides multiple images of himself or herself to the networking system 204, such as posting photos or videos to the networking system 204.

At the receiving end, the networking system 204 receives 314 the image of the user. As illustrated, the networking system 204 stores the received image in the image database 208. In one or more embodiments, the networking system 204 tags the image within the image database 208 with a user identifier (e.g., user id) associated with the user. In this manner, the image database 208 can collectively store images of the user in the same location (e.g., physically or virtually).

After the user provides one or more images to the networking system 204, the facial resemblance system 206 receives or accesses the image of the user from the image database 208. For example, the facial resemblance system 206 provides a user id to the image database 208, which in turn, looks up images of the user. The image database 208 can provide one or more images to the facial resemblance system 206. Additionally, and/or alternatively, the image database 208 can provide a video that contains images of the user to the facial resemblance system 206.

As shown in FIG. 3, the facial resemblance system 206 processes 316 the image of the user. Image processing can include various actions. In one or more embodiments, image processing includes locating and identifying the user (e.g., the face of the user) within the image. In some instances, the user's face is tagged within the image (e.g., by a networking system user).

In instances where the user's face is not tagged within the image, image processing can include identifying the user within the image. For example, the facial resemblance system 206 detects whether the image includes one or more faces. Upon detecting one or more faces, the facial resemblance system 206 prompts the user (or another networking user) to confirm that a detected face belongs to the user. Alternatively, and as described below, the facial resemblance system 206 can intelligently detect, based on other images provided by the user or previous confirmations, the user's face within the image.

Similarly, in one or more embodiments, image processing can include determining an orientation of the user's face. For example, the facial resemblance system 206 determines whether the user's face is forward facing. Alternative, the facial resemblance system 206 determines that the user is facing sideways or that only a portion of the user's face is visible in the image. In some embodiments, the facial resemblance system 206 may determine that the image of the user does not show enough of the user's face to adequately perform image processing on the image. In these embodiments, the facial resemblance system 206 prompts the user to submit another image, and/or considers additional images of the user (described below) in connection with the received image.

In addition to identifying the user within the image, image processing can include identifying one or more facial features of the user. As mentioned above, facial features can include distinct sections, regions, traits, or characteristics of a human face. In one or more embodiments, facial features can include parts of a face, such as eyes, mouth, nose, cheeks, ears, etc. In addition, facial features can include characteristics of a face, such as overall shape of the face, skin tone and texture, presence or omission of a facial feature (dimples, cleft chin, eyebrows, bald, etc.).

In additional and/or alternative embodiments, facial features include mathematical characteristics, measurements, and/or relationships between points, edges, or sections of a face. For example, the facial resemblance system 206 generates a facial attribute data vector that represents multiple attributes identified from the user's face. In one or more embodiments, the facial attribute data vector includes scores corresponding to the multiple identified attributes. Further, in some example embodiments, the data vector is represented in n-dimensional space, where n corresponds to the number of attributes represented by the data vector.

As described further below, the facial resemblance system 206 can compare facial attribute data vectors between two faces to identify similarities and differences between the two faces (e.g., by comparing the scores from facial attribute data vectors associated with each image). For instance, the facial resemblance system identifies look-alike user by subtracting the facial attribute data vector (e.g., the scores associated with the facial attributes) of each image of the other users from the user's facial attribute data vector to determine which pairing has the smallest absolute value difference. In one or more embodiments, the facial resemblance system 206 employs machine learning techniques and algorithms (e.g., principle component analysis to determine Eigenfaces) to identify facial features and/or representative data vectors. For example, the facial resemblance system 206 trains a machine learning model specific to the user that can identify look-alike users based on an input image of a user.

As part of image processing and identifying facial features, the facial resemblance system 206 can derive (or modify) metadata for the image. For example, the facial resemblance system 206 generates a list of attributes (in the form of a label, classification, tag, etc.) from facial features identified and analyzed within the image of the user. The facial resemblance system 206 then stores the list of attributes as metadata in connection with the image.

In addition to generating metadata from analyzing the image, the facial resemblance system 206 can also identify other information about the image that may assist the facial resemblance system 206 to determine facial resemblances. For example, the facial resemblance system 206 identifies and stores the creation date and time, the geo-location, the resolution, the file size, etc., of the image. In some embodiments, the facial resemblance system 206 also obtains social data associated with the image, such as number of "likes," "shares," and comments tied to the image.

Returning to FIG. 3, upon processing the image, the facial resemblance system 206 accesses or receives 318 images of other users from the image database 208. As mentioned previously, the image database 208 stores images of other users. The image database 208 can provide an image (or multiple images) of each user of the networking system 204 for the facial resemblance system 206 to compare to the user image. Alternatively, the image database 208 provides a subset of images to the facial resemblance system 206, particularly if the total number of images in the collection is voluminous or above a threshold value. For example, the facial resemblance system 206 identifies the subset based on common attributes between the user and other users.

In one or more embodiments, the images can be pre-processed by the facial resemblance system 206 and/or networking system 204. As described above, processing an image can include generating metadata for the images to indicate attributes associated with the images. When processed by the networking system 204, the facial resemblance system 206 need not reprocess an image. Rather the facial resemblance system 206 merely accesses the metadata and attributes identified by the networking system 204. Alternatively, the facial resemblance system 206 can reprocess and regenerate metadata and attributes for an image.

As mentioned above, the image database 208 can provide a subset of images to the facial resemblance system 206. To demonstrate, in some embodiments, the image database 208 indexes and/or groups images of networking users based on the attributes identified for the image during processing. Then, using image attributes, the image database 208 (or the facial resemblance system 206) can filter down the images to those that have attributes that match the image of the user (i.e., common attributes). For example, the facial resemblance system 206 identifies a subset of images that are most likely to have a resemblance to the user based on one or more common attributes between the image of the user and the subset of images.

As part of identifying similar facial features to determine the subset, the facial resemblance system 206 can first identify matching high-level facial features, followed by lower-level facial features if the high-level facial features are similar. Example high-level facial features include general features such as facial shape, hair/no hair, the location of a user's facial features (e.g., eyes, noise, and mouth) relative to the entire face, skin tone, etc. High-level facial features are often expressed using rough approximations. Using high-level facial features, the facial resemblance system 206 can quickly determine whether another user should be further considered (i.e., further analyzed and processed) or whether the other user does not share enough facial resemblance to the user and can be dismissed from consideration as a look-alike user. For instance, the facial resemblance system 206 can eliminate or exclude any other users that do not share one or more high-level facial features with the user.

In embodiments where the facial resemblance system 206 determines that another user shares similar high-level facial features with a user, the facial resemblance system 206 can further compare lower-level facial features. Examples of lower-level facial features include more detailed attributes that are expressed with precise quantitative measurements such as the distance between points, edges, and/or sections of a face. Additional examples of lower-level facial features include hair length, facial feature angles (e.g., chin angle), facial feature lengths (e.g., mouth, nose, eyes), distances between facial features (e.g., distance between eyes), facial feature curvatures/shapes, or pixel intensities. In this manner, the facial resemblance system 206 can refine the pool of other users that qualify as look-alike users.

In some example embodiments, the high-level facial features and lower-level facial features are represented as part of a facial attribute data vector, which is described above. For example, a first smaller subset of attribute scores associated with a user's facial attribute data vector represents high-level facial features and a second larger subset of scores from the user's facial attribute data vector or from an additional facial attribute data vector represents lower-level facial features. Thus, when comparing high-level facial features, the facial resemblance system 206 compares scores from the first smaller subset. Then, for those users that had similar high-level facial features, the facial resemblance system 206 compares scores from the second larger subset to identify look-alike users.

In one or more embodiments, the facial resemblance system 206 provides the high-level facial features to the image database 208, which returns images of other users having similar attributes. At this stage, the facial resemblance system 206 can further compare the lower-level facial features with the returned images. In another example, the facial resemblance system 206 receives a collection of images from the image database 208, and based on the user's high-level facial features, the facial resemblance system 206 filters out each image of other users that does not have matching high-level facial features.

By filtering out images of other users that do not share high-level facial features with the user, the facial resemblance system 206 can reduce the amount of processing resources needed to identify similar faces to the user, which in turn, improves the performance of the computing device performing the image comparisons. The facial resemblance system 206 can continue to add attribute filters until the number of look-alike users is below a threshold number (e.g., 100, 50, 20, etc.). Likewise, the facial resemblance system 206 can relax the number of attribute filters to increase the number of other users that are look-alike user candidates.

Using the images of other users received from the image database 208, the facial resemblance system 206 identifies 320 look-alike users having a facial resemblance to the user. In general, the facial resemblance system 206 compares facial features of the user to those of the other users to determine if one or more other users have a facial resemblance to the user (e.g., look-alike users).

In one or more embodiments, the facial resemblance system 206 employs machine learning techniques or algorithms to compare facial features among images of other users. As an overview, in some embodiments, machine learning uses deep learning neural networks to analyze vast quantities of data (e.g., big data), and based on the analytics, identify similar recognized patterns. Further, as the amount of data increases, machine learning generally becomes more accurate. Some examples of machine learning include support vector machines (SVM), clustering, k-nearest neighbors, and others recognized by those skilled in the art.

Accordingly, in one or more embodiments, the facial resemblance system 206 employs machine learning techniques or algorithms to compare facial features among images of other users to determine which of the images of other users have a facial resemblance to the user (e.g., are look-alike users) based on a trained model associated with the user. For example, the facial resemblance system 206 uses machine learning to train a model that can identify look-alike users based on an input image of a user. In particular, the facial resemblance system 206 inputs the image of the user into a deep neural network to identify one or more images of other users that are look-alike users based on those other users having similar facial features to the user. In some instances, the facial resemblance system 206 identifies other users that have similar facial features to the user by mathematically comparing the facial attribute data vector for the user to the facial attribute data vector of the other users in n-dimensional space to determine with other users are located in close proximity to the user.

When employing machine learning, the facial resemblance system 206 can output various results. In some embodiments, the facial resemblance system 206 outputs a resemblance score in connection with the image of another user. The resemblance score can be relative (e.g., 0-100%) and/or absolute (e.g., 1-5, -100-100, or using any real number). Using the resemblance score, the facial resemblance system 206 can rank the images of other users from most alike to least alike.

The facial resemblance system 206 can compute a resemblance score for an image of another user based on how closely the face of the other user resembles the user. For example, the resemblance score is based on the distance between the user's image and the images of other users in the n-dimensional space. In other words, the resemblance score is a compilation of how closely each facial feature of the user resembles the corresponding facial feature of another user.

As part of computing a resemblance score, the facial resemblance system 206 can assign different weights to different facial features or attributes. For example, the facial resemblance system 206 weights the similarity of face shape with greater importance than eye color. As another example, the facial resemblance system 206 weights skin tone and texture lower than the relative position of multiple facial features to one another (e.g., eyes, nose, and mouth). Further, the facial resemblance system 206 can modify and refine the weighting based on user feedback and additional data to obtain more accurate results.

When computing resemblance scores, the facial resemblance system 206 can use the resemblance score to identify look-alike users. In one or more embodiments, the facial resemblance system 206 determines that image pairs (e.g., the user's image and the image of another user) having a resemblance score above a predetermined relative similarity value (e.g., 80%, 90%, or 95%) or absolute similarity value (e.g., 1, 8.5, or 253.) are look-alike users. Alternatively, the facial resemblance system 206 selects a predetermined number of other users as look-alike users (e.g., the top 3, 5, or 10 resemblance scores). In some cases, the facial resemblance system 206 employs a combination of the above factors in selecting look-alike users.

As shown in FIG. 3, the facial resemblance system 206 provides 322 the look-alike users to the user via the user client device 310. FIG. 1 above illustrates an example of the facial resemblance system providing look-alike users to a user. For instance, the facial resemblance system 206 causes the provided look-alike users to surface within a client application of the user client device 310. As described above, the user can engage in communication (e.g., message or directly connect) with a look-alike user with the networking system 204.

As a note, the facial resemblance system 206 can disqualify another user as a look-alike user if that other user is socially related to the user. For example, the other user is currently connected to the user or the user is indirectly connected to the user (e.g., friend of a friend). For example, the facial resemblance system 206 determines that the user's parent, sibling, or cousin has a facial resemblance to the user; however, because the user is familiar with or is connected to this family member, the facial resemblance system 206 disqualifies the family member as a look-alike user. Further, by disqualifying other users that are familiar to the user, the facial resemblance system 206 encourages the user to connect with a wider range of networking users.

While the above description and sequence diagram describe determining look-alike users based on a single image of the user, in one or more embodiments, the facial resemblance system employs multiple images of the user and/or other users to determine look-alike users to provide to the user. By increasing the number of images of the user and/or other users, the facial resemblance system 206 increases accuracy and the potential of identifying closely matching look-alike users.

When the facial resemblance system 206 receives multiple images of a user (or another user), the facial resemblance system 206 can combine attribute data from the multiple images of the user to generate a fuller representation of the user. When joining common attributes from multiple images of the user, the facial resemblance system 206 can give each attribute equal weighting.

Alternatively, the facial resemblance system 206 assigns attributes from one image greater weight than attributes from another image. As an example, if the user indicates a preference for a particular image (e.g., a profile picture), the facial resemblance system 206 weights the attributes of the preferred image over the attribute of other images of the user (e.g., images posted to the user's wall). As another example, the facial resemblance system 206 places a greater weight on recent images over older images. In another example, the facial resemblance system 206 weights images of the user based on facial orientation and/or picture quality. As a further example, the facial resemblance system 206 weights images of the user based on social data, such as weight an image with a high number of "likes" above an image of the user with fewer "likes." Additionally, the facial resemblance system 206 weights attributes for each image of the user based on a combination of two or more of the above factors.

In addition, when the facial resemblance system 206 receives multiple images of a user (and other users), the facial resemblance system 206 can often generate a three-dimensional model of the user's facial feature. The facial resemblance system 206 can then rotate the three-dimensional model to obtain images and facial features of the user's face at different angles. Further, the facial resemblance system 206 can greatly improve the accuracy of identifying look-alike users by comparing a user's three-dimensional facial model to three-dimensional facial models of other users.

In some embodiments, the facial resemblance system 206 receives a video of a user and extracts one or more images of the user. Likewise, the facial resemblance system 206 can extract one or more images of other users from videos including other users. In general, a video that includes a user enables the facial resemblance system 206 to extract multiple images of the user at different angles and orientations, which assists the facial resemblance system 206 in identifying highly accurate facial features for the user, as described above.

Figure 4B:
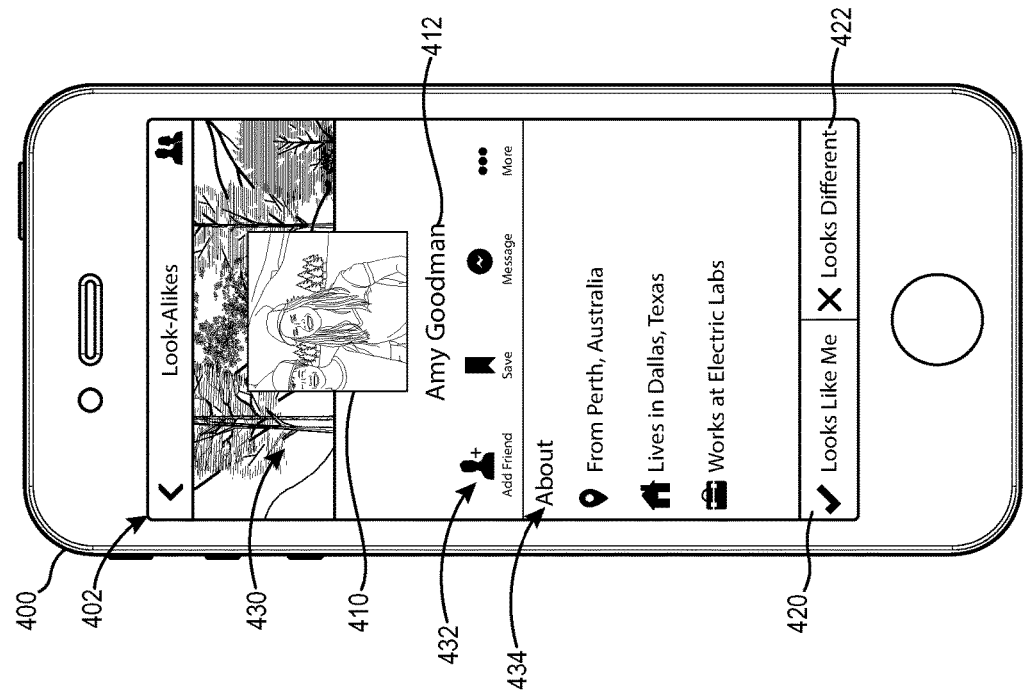
FIGS. 4A-4B illustrate example graphical user interface views on a client device of a user validating look-alike users presented by the facial resemblance system in accordance with one or more embodiments described herein.
Figure 4A:
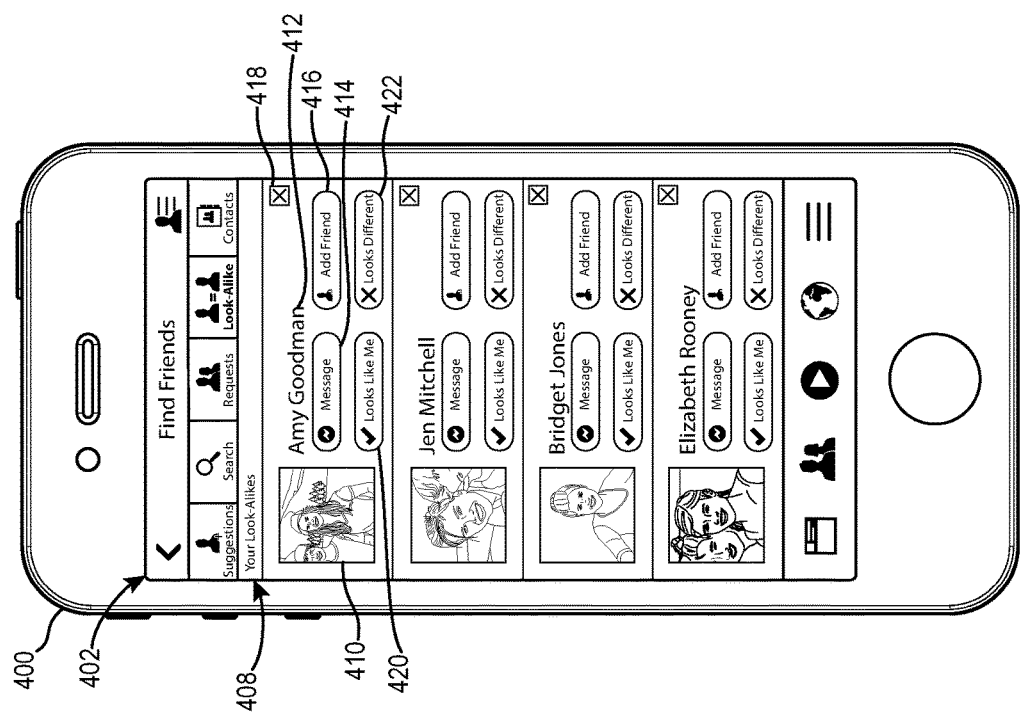

FIGS. 4A-4B illustrate example graphical user interface views on a user client device of a user validating look-alike users presented by the facial resemblance system. As shown, FIGS. 4A-4B each includes a user client device 400 and a graphical user interface 402 within a client application (e.g., a social networking client application). The user client device 400 can be an example embodiment of the first client device 210a described above.

As mentioned, FIG. 4A illustrates a user client device 400 displaying look-alike users 408 to a user of a networking system (e.g., the user associated with the user client device 400) within a client application such as a networking application. As shown, each look-alike user includes an image 410 and a name 412 of the look-alike user, a messaging option 414 for the user to contact the look-alike user, a connection option 416 for the user to socially connect to the look-alike user, and a removal option 418. These elements (i.e., 410-418) are each described above with respect to FIG. 1 (i.e., corresponding elements 110-118).

In one or more embodiments, the list of look-alike users 408 is based primarily or solely on the visual similarities between the user and other users of the networking system. In one example, the facial resemblance system does not factor or minimizes the effects of other commonalities when presenting the look-alike users 408. Thus, but for the facial resemblance between the user and other users, the networking system would not identify the other user as a recommended connection (e.g., friend). In another example, the facial resemblance system heavily weighs facial resemblances over other factors, such a location, gender, demographics, etc., such that facial resemblance is the principal factor in identifying and providing the look-alike users 408. Furthermore, the look-alike users may be users that are not closely connected to the user within a social networking. For example, the look-alike users may be users that are separated from the user by 3, 4, 5, or more degrees of separation within a social networking system. Accordingly, the social networking system would be unlikely to recommend that the user engage with the other users using conventional recommendation heuristics and algorithms. Alternatively, in some example embodiments, the facial resemblance system equally considers other factors as part of determining other users that are included in the look-alike users 408.

In one or more embodiments, the facial resemblance system evolves and improves based on user feedback. To demonstrate, the facial resemblance system enables a user to validate whether each look-alike user looks like the user. As shown in FIG. 4A, the graphical user interface 402 includes, for each look-alike user, validation or feedback elements, such as an approval element 420 (e.g., "Looks like me") and a disapproval element 422 (e.g., "Looks different"). By selecting the approval element 420, a user is indicating to the facial resemblance system that the user agrees that a selected look-alike user has a facial resemblance to the user. Likewise, by selecting the disapproval element 422, the user indicates to the facial resemblance system that the user and the look-alike user do not have a facial resemblance. In these embodiments, the facial resemblance system then uses the validation feedback to improve the look-alike selection process (described below with respect to FIG. 5).

Upon a user selecting the approval element 420 or the disapproval element 422, in one or more embodiments, the facial resemblance system quickly reprocesses the list of look-alike users based on the validation feedback from the user. For example, the facial resemblance system identifies other users of the networking system that have a facial resemblance with the validated look-alike user to identify other users not previously identified. Alternatively, the facial resemblance system stores the user validation feedback and updates the list of look-alike users at a later time, such as on a periodic schedule, when the user is offline, or upon a manual user request (e.g., the user swipes down the list of look-alike users 408 to request updated users).

As an alternative to providing an approval element 420 and a disapproval element 422, the facial resemblance system provides another type of validation that is more granular. To illustrate, the facial resemblance system provides a rating element that enables the user to indicate how closely a look-alike user resembles the user. For example, the rating element is a slider that moves from "looks like me," 100%, 10, or "strongly agrees" to "looks different," 0%, 0, or "strongly disagrees," respectively. Upon receiving the user-indicated rating for a look-alike user, the facial resemblance system can translate the rating into a weighted score. The facial resemblance system then uses the weighted score to improve the look-alike selection process.

Regardless of which type of validation or rating elements the facial resemblance system provides to a user, in one or more embodiments, the facial resemblance system infers feedback from a user's actions or non-actions. In one example, if the user engages with a look-alike user, the facial resemblance system can infer a positive facial resemblance to the user. As another example, if a user views the list of look-alike users multiple times (e.g., five or more times) and does not provide any feedback, the facial resemblance system infers a negative facial resemblance to the user. As such, the facial resemblance system can negatively label the look-alike users and/or present other look-alike users to the user.

As shown, FIG. 4A illustrates a list of look-alike users 408, where each look-alike user includes an option for the user to engage with a selected look-alike user (e.g., the messaging option 414 and the connection option 416). In some embodiments, the engagement options are hidden until both the user and the look-alike user both validate that they share a facial resemblance. In cases where only one user has validated that a look-alike user shares a facial resemblance, the facial resemblance system can notify, either discreetly or openly, the look-alike user that another user believes they share a facial resemblance and prompt the look-alike user to validate the resemblance. If the look-alike user agrees, the facial resemblance system can enable the engagement options. If the look-alike user does not agree, the facial resemblance system can notify the original user and/or remove the look-alike user from the user's list of look-alike users.

Along these lines, in one or more embodiments, the facial resemblance system prevents a look-alike user from appearing on a user's list of look-alike users until both the user and the look-alike user have granted the facial resemblance system permission (e.g., opt-in) to be a look-alike user for other users. In other words, the facial resemblance system does not present the user with the list of look-alike users until the user opts-in as a look-alike user. Similarly, the facial resemblance system only includes other users as look-alike candidates to the user if the other users also have opted-in. In this manner, the facial resemblance system preserves the privacy of both the user and look-alike user.

Further, in some embodiments, the facial resemblance system disqualifies another user from being a look-alike user to a particular user (e.g., disqualifies the pair as look-alike users) if one or more conditions are not met. For example, the facial resemblance system disqualifies the pair as look-alike users if the user specifies not to include other users with one or more characteristics as look-alike users. As another example, the facial resemblance system disqualifies the pair as look-alike users if the age difference between the two users is beyond a threshold or if one user is above 18 and another user is below 18.

FIG. 4B illustrates the networking profile of a selected look-alike user. More specifically, FIG. 4B illustrates an updated graphical user interface 402 on the user client device 400 to display a networking profile 430 of a selected look-alike user. For example, a user selects the image 410 or name 412 of the first look-alike user within the list of look-alike users shown in FIG. 4A, and in response, the graphical user interface 402 updates to show the networking profile 430 (e.g., a social networking profile).

As shown, the networking profile 430 includes images and information about the selected look-alike user. For example, the networking profile 430 includes the image 410 and name 412 of the selected look-alike user. The networking profile 430 also includes social engagement elements 432 that enables the user of the user client device 400 to connect with, message, save, etc. the selected look-alike user. Additionally, the networking profile 430 includes social information 434 shared by the selected look-alike user with other users of the networking system. In some cases, access to the networking profile 430 and/or social information 434 is dependent on privacy settings of the selected look-alike user.

FIG. 4B also illustrates the approval element 420 and the disapproval element 422. In some cases, the approval element 420 and the disapproval element 422 is only displayed within a look-alike user's networking profile 430. In other cases, the approval element 420 and the disapproval element 422 are included in multiple locations, as described above. As also described above, the facial resemblance system can replace or supplement the approval element 420 and the disapproval element 422 with other rating elements.

Figure 5:
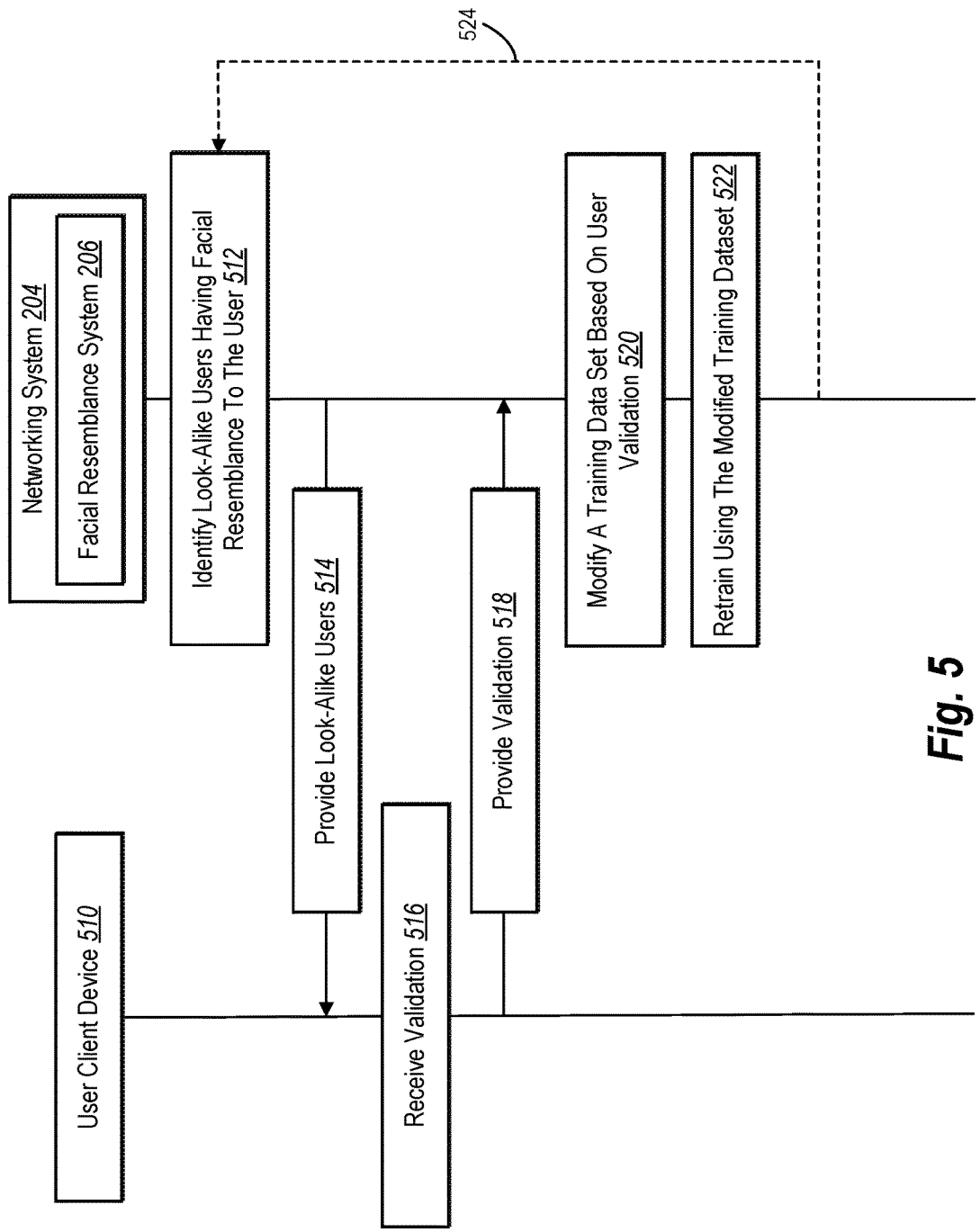
FIG. 5 illustrates a sequence diagram of training the facial resemblance system based on user validation in accordance with one or more embodiments described herein.

FIG. 5 illustrates a sequence diagram of training the facial resemblance system based on user validation. As illustrated, FIG. 5 includes the networking system 204 and the facial resemblance system 206 described above. In addition, FIG. 5 includes a user client device 510. The user client device 510 can represent one or more embodiments of the above-described first client device 210a.

FIG. 5 includes one or more actions described above. For example, as shown in FIG. 5, the facial resemblance system 206 identifies 512 look-alike users having a facial resemblance to the user. Then, the facial resemblance system 206 provides 514 the look-alike users to a user via the user client device 510. The user client device 510 can present the look-alike users to the user along with options to validate whether the look-alike user has a facial resemblance with the user. If the user provides a positive validation, the user client device 510 receives 516 the validation. Further, the user client device 510 provides 518 the user validation to the facial resemblance system 206.

More specifically, the actions of identifying look-alike users is described above. For example, the description of FIG. 3 explains one or more embodiments of determining one or more look-alike users to a user of a networking system. Additionally, providing and receiving user validation is illustrated described above in connection with FIGS. 4A-4B. For example, a user may approve, disapprove, or rank a level of resemblance between the user and a selected look-alike user.

In some embodiments, as previously described, the facial resemblance system 206 employs machine learning to identify look-alike users. As part of machine learning, the facial resemblance system 206 generates a model using a dataset of samples to "learn" when one user shares a facial resemblance with another user. For example, the training set includes sample pairs of look-alike users and sample pairs of non-look-alike users. The facial resemblance system 206 then trains the model using the training dataset and the image of the user to identify images that having a facial resemblance to the user. For instance, training the model using the image of the user helps the facial resemblance system 206 refine facial features weighting used when identifying look-alike users.

One common problem with employing machine learning, especially in the field of image processing, is the lack of having a reliable training dataset. If the training dataset is unreliable, then the facial resemblance system 206 improperly or incorrectly learns, resulting in inaccurate look-alike pairings. However, if an improved dataset becomes available, the facial resemblance system 206 can retrain using the updated dataset to achieve more accurate results.

As shown in FIG. 5, the facial resemblance system 206 modifies 520 a training dataset based on user validation received from the user client device 510 (and from other users providing user validation). For example, the facial resemblance system 206 adds new sample pairs of look-alike users and non-look-alike users to the training dataset. In the case that the user validation includes a resemblance level, the facial resemblance system adds a weighted sample pair of look-alike users. As users provide user validation, the training dataset becomes more reliable.

The facial resemblance system 206 retrains 522 using the modified training dataset. In other words, the facial resemblance system 206 updates the model created using the original training dataset based on the modified training dataset. As mentioned above, the facial resemblance system 206 can improve and achieve more accurate results by retaining with a more reliable training dataset. Accordingly, after training with the modified training dataset, the facial resemblance system 206 can better identify look-alike users to a user.

Accordingly, as shown in step 524 (e.g., the dashed line), the facial resemblance system 206 can continually repeat the actions of identifying look-alike users, providing the user with look-alike users, receiving user validation, modifying the training dataset, and retraining the model using the modified training dataset (e.g., 512-522). In this manner, the facial resemblance system constantly improves the reliability of the training dataset as well as the accuracy of identifying look-alike users that have a facial resemblance to a user.

Figure 6B:
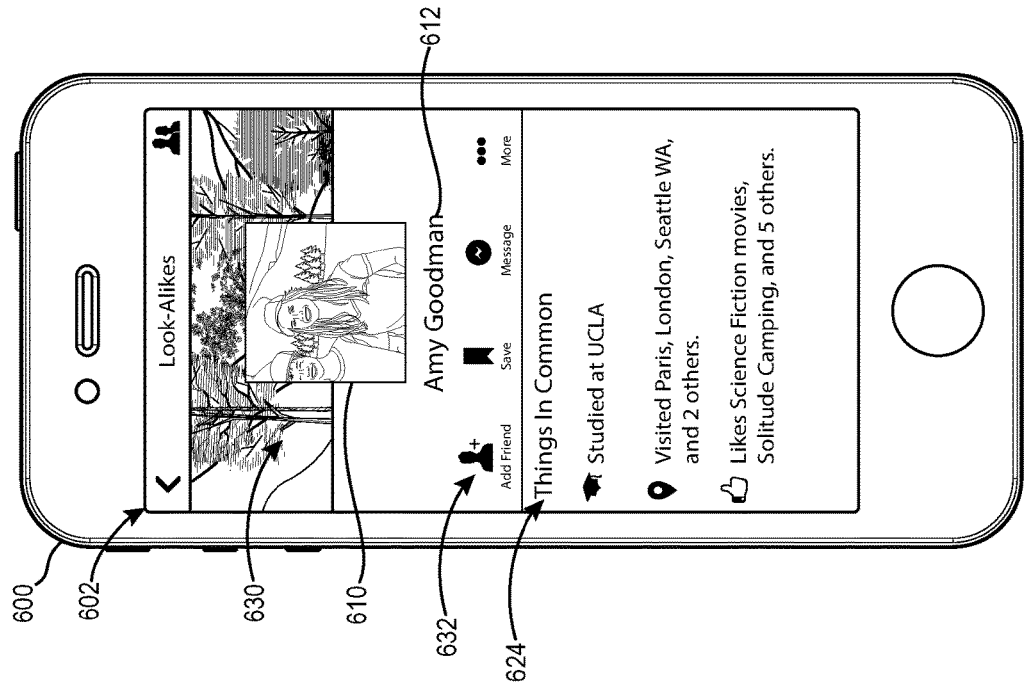
FIGS. 6A-6B illustrate example graphical user interface views on a client device of organizing the presentation of look-alike users based on secondary factors in accordance with one or more embodiments described herein.
Figure 6A:
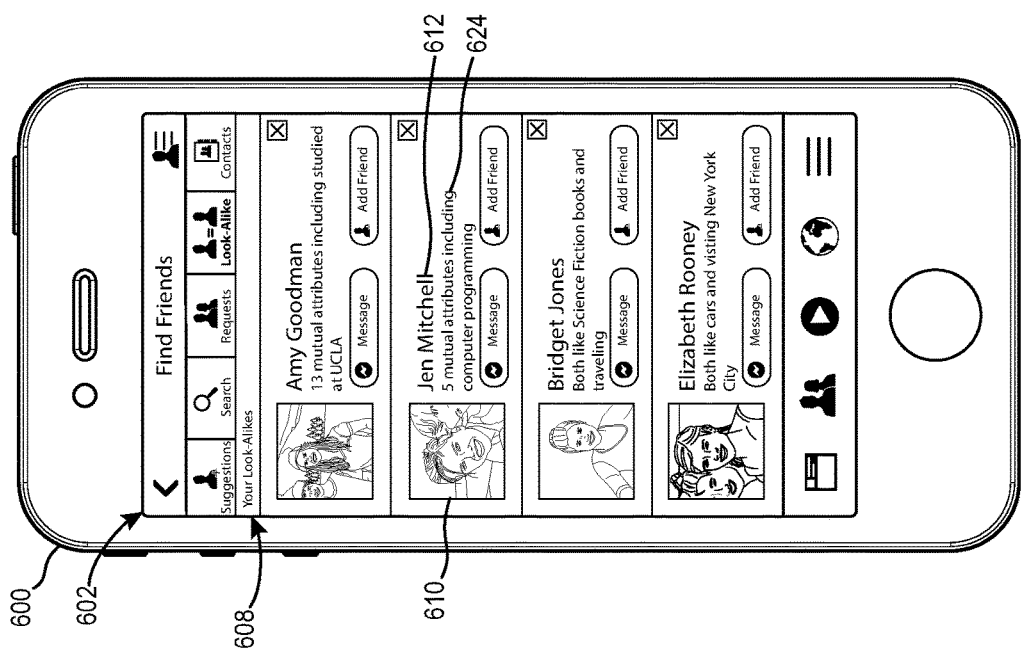

FIGS. 6A-6B illustrate example graphical user interface views on a client device of organizing the presentation of look-alike users based on secondary factors. As shown, FIGS. 6A-6B each includes a user client device 600 and a graphical user interface 602 within a client application. The user client device 600 can be an example embodiment of the first client device 210a described above.

FIG. 6A illustrates a user client device 600 displaying look-alike users 608 to a user of a networking system (e.g., the user associated with the user client device 600) within a client application such as a networking application. As shown, each look-alike user includes an image 610 and a name 612 of the look-alike user. These elements (i.e., 610-612) are each described above with respect to FIG. 1 (i.e., corresponding elements 110-112).

In one or more embodiments, the list of look-alike users 608 is organized based upon degree or level of facial resemblance similarity (e.g., descending from highest facial resemblance score). Alternatively, the look-alike users 608 are organized based on one or more secondary factors. For example, as shown in FIG. 6A, the facial resemblance system sorts the list of look-alike users 608 based on user compatibility. Other factors that the facial resemblance system can use to sort the look-alike users 608 include geographic location of users (e.g., near to far), demographic information (e.g., relationship availability status, political preference, age, etc.), name spelling (e.g., alphabetical order by first or last name), number of social connections, etc.

As mentioned above, FIG. 6A shows the list of look-alike users 608 organized based on one or more commonalities 624. In one or more embodiments, the facial resemblance system determines commonalities using a commonality score (e.g., a social-graph affinity) between the user and each look-alike user. For example, the facial resemblance system considers mutual attributes such as interests, experiences, education, locations, etc., in determining the commonality score. Various systems methods for determining a commonality score are provided below in connection with FIG. 11 as described in terms of determining a social-graph affinity and affinity coefficients.

Using one or more commonalities 624 (e.g., a commonality score) between the user and each look-alike user, the facial resemblance system can organize and sort the list of look-alike users 608 within the graphical user interface 602. For example, as shown in the list of look-alike users 608, the number of commonalities between the user's and the first look-alike user is greater than the number of commonalities between the user and the second look-alike user. Likewise, the number of commonalities between the user's and the second look-alike user is greater than the number of commonalities between the user and the fourth look-alike user.

By sorting the list of look-alike users 608 based on commonality, the facial resemblance system encourages the user to connect with a look-alike user. For example, not only does the facial resemblance system show the user that he or she has a similar facial resemblance with a look-alike user, the facial resemblance system also presents other attributes where the user intersects with the look-alike user, which further encourages the user to engage with the look-alike user.

In some embodiments, the user selects a look-alike user from the list of look-alike users 608. Upon selecting the image 610 or name 612 of a look-alike user, the facial resemblance system updates the graphical user interface 602 to display the networking profile of the selected look-alike user. Similarly, upon a user selecting one or more commonalities 624 of a look-alike user, the graphical user interface 602 updates to display the networking profile of the selected look-alike user. Alternatively, upon a user selecting one or more commonalities of a look-alike user, the graphical user interface 602 provides a pop-up list of the one or more commonalities of the selected look-alike user over the list of look-alike users 608.

As shown in FIG. 6B, the facial resemblance system displays the networking profile 630 of a selected look-alike user. Like the networking profile described above, the networking profile 630 includes the image 610 and name 612 of the selected look-alike user. The networking profile 630 also includes social engagement elements 632 that enable the user of the user client device 600 to connect with, message, save, etc., the selected look-alike user.

Additionally, the illustrative embodiment shows that the networking profile 630 includes one or more commonalities 624 between the user and the selected look-alike user (e.g., "Things in Common"). As illustrated, both the user and the selected look-alike user studied at the same university, vacationed in the same places, and like many of the same things like sci-fi movies. In some embodiments, if the user selects a specific commonality category, the facial resemblance system can expand to reveal each mutual commonality in the commonality category.

As mentioned above, when the facial resemblance system provides look-alike users in combination with commonalities to a user, the user is more inclined to engage with the look-alike user. Further, independent claims, providing commonalities in connection with a look-alike users encourages a user to provide user feedback validation to the facial resemblance system. For example, the facial resemblance system highlights or prominently positions a look-alike user because the look-alike user has multiple commonalities with the user. However, if the user does not agree that the look-alike user has a similar facial resemblance, the user will provide feedback to the facial resemblance system, which will improve the facial resemblance system.

Figure 7:
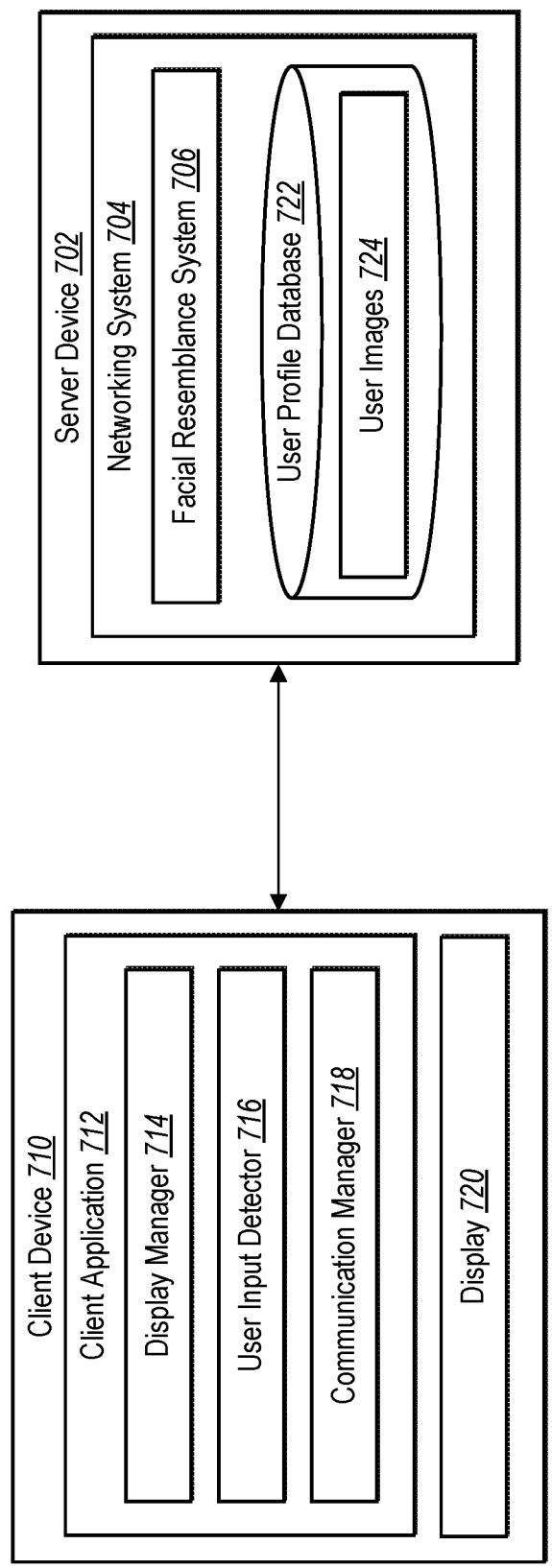
FIG. 7 illustrates an example schematic diagram of a facial resemblance system in communication with a client device in accordance with one or more embodiments described herein.

FIG. 7 illustrates an example schematic diagram of a facial resemblance system 706 (within a networking system 704) in communication with a client device 710. The networking system 704, the facial resemblance system 706, and the client device 710 described in FIG. 7 can be example embodiments of the networking system 204, the facial resemblance system 206, and the client devices (e.g., the client device 100, the first client device 210a, and/or the user client device 310, 400, 510, 600) described in connection with the preceding figures. For example, the client device 710 is a mobile client device that a user employs to access the facial resemblance system 706 within a networking system 704.

Furthermore, the components 704-724 of the server device 702 can comprise software, hardware, or both. For example, the components 704-724 can comprise one or more instructions stored on a computer-readable storage medium and executable by processors of one or more computing devices. When executed by the one or more processors, the computer-executable instructions of the facial resemblance system 706 can cause the server device 702 and/or the client device 710 to perform the methods described herein. Alternatively, the components 704-724 and their corresponding elements can comprise hardware, such as a special purpose processing device to perform a certain function or group of functions. Additionally, the components 704-724 can comprise a combination of computer-executable instructions and hardware.

As FIG. 7 illustrates, the client device 710 includes a client application 712, which includes a display manager 714, a user input detector 716, and a communication manager 718. The client device 710 also includes a display 720. One will appreciate that the client device 710 can include additional components and/or modules, such as other applications or pieces of hardware.

In one or more embodiments, the client application 712 is a native application installed on the client device 710. For example, the client application 712 is a mobile application that installs and runs on a mobile device, such as a smartphone or a tablet computer. Alternatively, the client application 712 can be a desktop application, widget, or another form of a native computer program. Furthermore, the client application 712 may be a remote application accessed by the client device 710. For instance, the client application 712 is a web application executed within a web browser of the client device 710.

As mentioned above, and as shown in FIG. 7, the client application 712 includes the display manager 714. The display manager 714 provides, manages, and/or controls a graphical user interface that allows a user of the client device 710 to interact with features of the facial resemblance system 706 and/or networking system 704. For example, the display manager 714 generates the graphical user interface that includes one or more look-alike users that have a facial resemblance with the user of the client device 710.

The display manager 714 also facilitates the input of text or other data for the purpose of interacting with one or more features of the client application 712. For example, the display manager 714 provides a user interface that includes a touch display keyboard. A user can interact with the touch display keyboard using one or more touch gestures to provide user input. For instance, a user can use the touch display keyboard to input various characters, symbols, icons, or other information.

As further illustrated in FIG. 7, the client application 712 includes the user input detector 716. In one or more embodiments, the user input detector 716 detects, receives, and/or facilitates user input in any suitable manner. In some instances, the user input detector 716 detects one or more user interactions (e.g., a single interaction, or a combination of interactions) with respect to the user interface. For example, the user input detector 716 detects a user interaction from a keyboard, mouse, touch page, touch screen, and/or any other input device.

The terms "interact" or "interacting," as used herein, refer to any type of interface activity between a user (e.g., a content producer or a viewer) and a client device (e.g., a content producer client device or a viewer client device). For example, interacting can include a user viewing, browsing, accessing, and/or otherwise experiencing video content. Moreover, interacting can include selecting elements on a client device, such as selecting menu options or graphical buttons to engage with a look-alike user.

The user input detector 716 may additionally, or alternatively, receive data representative of a user interaction. For example, the user input detector 716 may receive one or more user-configurable parameters from a user, one or more commands from the user, and/or any other suitable user input. The user input detector 716 may receive input data from one or more components of the networking system 704, facial resemblance system 706, and/or from one or more remote locations.

The client application 712 performs one or more functions in response to the user input detector 716 detecting user input and/or receiving other data. Generally, a user can control, navigate within, and otherwise use the client application 712 by providing one or more user inputs that the user input detector 716 detects. For example, in response to the user input detector 716 detecting user input, one or more components of the client application 712 provide the user with one or more look-alike users.

As also illustrated in FIG. 7, the client application 712 includes a communication manager 718. The communication manager 718 can facilitate receiving and sending data to and from the networking system 704 and/or facial resemblance system 706. For example, the communication manager 718 can facilitate receiving and sending content, including look-alike users. In one or more embodiments, the communication manager 718 can receive content from the networking system 704 and/or facial resemblance system 706 through one or more communication channels using an appropriate communication protocol, format the content in any necessary format, and provide the content to the display manager 714, as described herein.

The client device 710 also includes the display 720. For example, in one or more embodiments the client device 710 includes at least one display 720 (e.g., a touch screen display). The display 720 can be built-in, or a peripheral device attached to the client device 710. In additional embodiments, the client device 710 includes multiple displays.

As shown in FIG. 7, and as mentioned above, the facial resemblance system 706 is part of a networking system 704, which also includes a user profile database 722. In addition, the facial resemblance system 706 is hosted by a server device 702. In some embodiments, multiple server devices host the networking system 704 and facial resemblance system 706.

As described in detail above, the facial resemblance system 706 identifies and provides a user of the networking system 704 (e.g., a social networking system or other electronic messaging system) with other users that have a facial similarity to the user (e.g., a look-alike user). In one or more embodiments, the facial resemblance system 706 uses attributes and/or metadata to filter and reduce the number of other users that potentially have a facial resemblance to a user. In some embodiments, the facial resemblance system 706 employs machine learning to identify look-alike users. Further, the facial resemblance system 706 can use validation feedback to improve the machine learning process, which improves the accuracy of identifying look-alike users.

The user profile database 722 can include user profile data and social connections between users of the networking system 704. For example, social data includes user profile information, such as personal information about a user (e.g., name, gender, age, birth date, hometown, etc.), contact information (e.g., residence address, mailing address, current city, email addresses, phone numbers, screen names, etc.), and family and relationship information (e.g., married to, engaged to, partners with, parents of, siblings of, children of, cousin of, friends of relationship with, etc.).

The user profile database 722 shown includes one or more user images 724. As described above, the facial resemblance system 706 uses images of users (e.g., the user and another user) to identify other users that have a facial resemblance to the user. In some embodiments, the facial resemblance system 706 uses multiple images and even video of the user and/or other users to identify look-alike users.

FIGS. 1-7, the corresponding text, and the examples provide a number of different methods, systems, and devices for providing a user with other users of a networking system that have a facial resemblance to the user. In addition to the foregoing, one or more embodiments can also be described in terms of flowcharts comprising acts in a method for accomplishing a particular result. For example, FIG. 8 may be performed with more or fewer acts. Further, the acts may be performed in differing orders. Additionally, the acts described herein may be repeated or performed in parallel with one another or in parallel with different instances of the same or similar acts.

Figure 8:
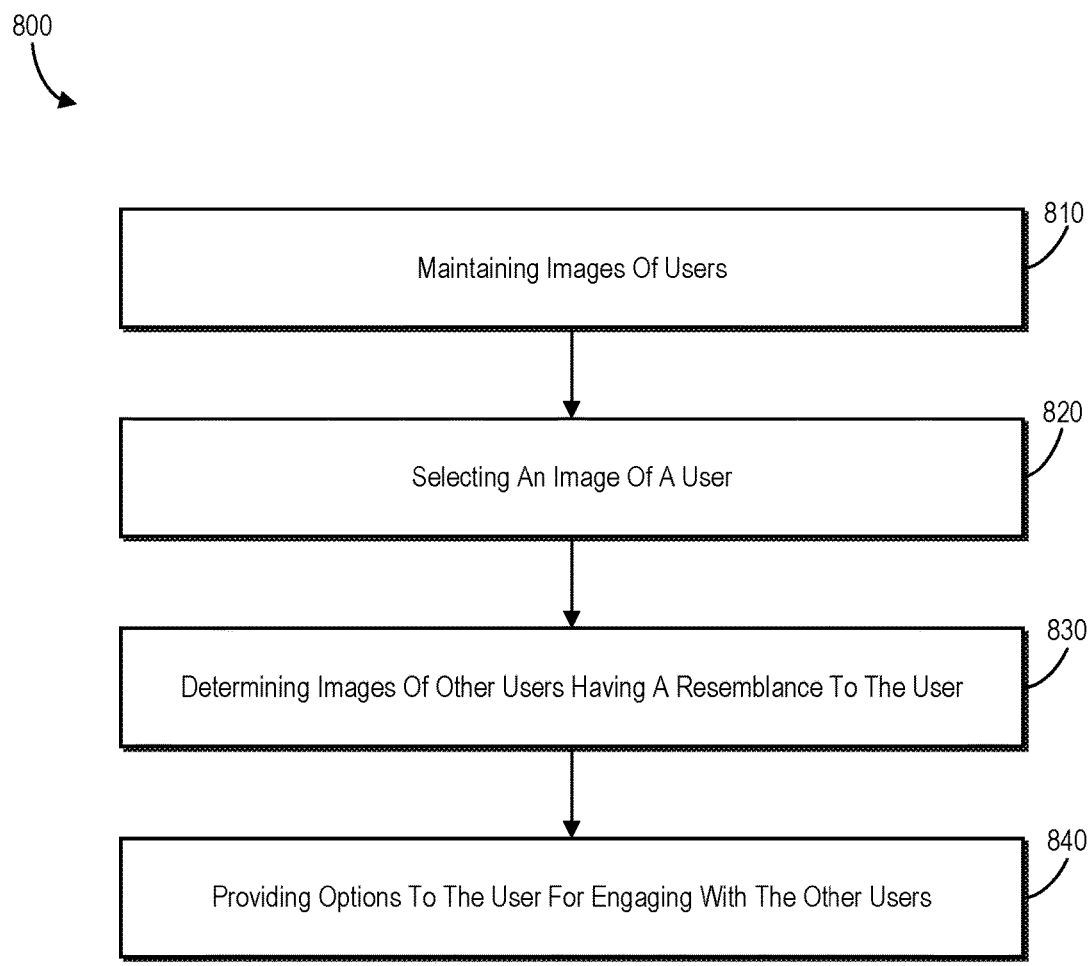
FIG. 8 illustrates a flowchart of a method of determining look-alike users in accordance with one or more embodiments described herein.

FIG. 8 illustrates a flowchart of a method 800 of determining look-alike networking users for a given user. In one or more embodiments, the facial resemblance system 206, 706 described herein performs the method 800. For example, a facial resemblance system 206 residing on a networking system 204, 704 and operating on a server device 202, 702 performs the method 800.

The method 800 includes an act 810 of maintaining images of users. In particular, the act 810 may involve maintaining a plurality of images of users of a networking system. In one or more embodiments, one or more images in the plurality of images include facial features of users of the networking system. In some embodiments, the plurality of images is provided by users of the networking system.

The method 800 also includes an act 820 of selecting an image of a user. In particular, the act 820 may involve selecting an image from the plurality of images that corresponds to a user of the networking system. In one or more embodiments, selecting an image of the user includes identifying the face of the user within one or more images. For example, selecting an image corresponding to the user from the plurality of images includes performing facial detection on the plurality of image to identify the user.

In addition, the method 800 includes an act 830 of determining images of other users having a resemblance to the user. In particular, the act 830 may involve determining, based on one or more facial features of the user within the selected image, one or more images of one or more other users from the plurality of images having a facial resemblance to the user. In one or more embodiments, determining the one or more images of the one or more other users from the plurality of images that have a facial resemblance to the user is based on comparing one or more facial features between the selected image and each image of the one or more other users from the plurality of images.

In some embodiments, the act 830 also includes the determining, for each image from the plurality of users, a facial attribute data vector based on one or more facial features identified within the image. Further, the act 830 includes the act of determining, for each image from the plurality of images, a resemblance score with the selected image based on the facial attribute data vector determined for the image and the facial attribute data vector determined for the selected image. In some embodiments, determining the one or more images of the one or more other users from the plurality of images having a facial resemblance to the user is based on determining that the one or more images of the one or more other users have a resemblance score with the selected image above a threshold value.

The method 800 also includes an act 840 of providing options to the user for engaging with the other users. In particular, the act 840 may involve providing, to the user and via the networking system, one or more options for engaging with the one or more other users having a facial resemblance to the user. In some embodiments, the act 840 also includes receiving, from the user, a selection of an engagement option associated with the one or more other users to directly connect to the user to the one or more other users within the networking system and/or to communicate with the one or more other users via an electronic message within the networking system.

The method 800 can also include one or more additional acts. For example, the method 800 includes the acts of identifying a subset of images from the plurality of images of users of the networking system by excluding images of users from the plurality of images that do not share one or more high-level facial features with the selected image. In one or more embodiments, the method 800 includes an act of determining one or more images of one or more other users having a facial resemblance to the user from the subset of images. In some embodiments, the method 800 includes an act of comparing lower-level facial features between the subset of images and the selected image to identify the one or more images of other users having a facial resemblance to the user. In some example embodiments, the lower-level facial features include a distance between points and edges within the selected image.

As another example, the method 800 includes the act of employing machine learning to determine the one or more images of the one or more other users from the plurality of images. The method 800 also includes the act of receiving, from the user, validation that the one or more images of the one or more other users have a facial resemblance to the user; modifying a machine learning model associated with the user based on the validation; identifying, based on the modified machine learning model, one or more additional images of one or more additional users from the plurality of images that have a facial resemblance to the user; and providing one or more options for engaging with the one or more additional users having a facial resemblance to the user.

In one or more embodiments, the method 800 includes the act of determining, for each of the one or more other users, a commonality score with the user, and ranking a presentation of the one or more other users based on the commonality scores. In one or more embodiments, each commonality score is based on intersecting attributes between the user and the one or more other users.

Figure 9:
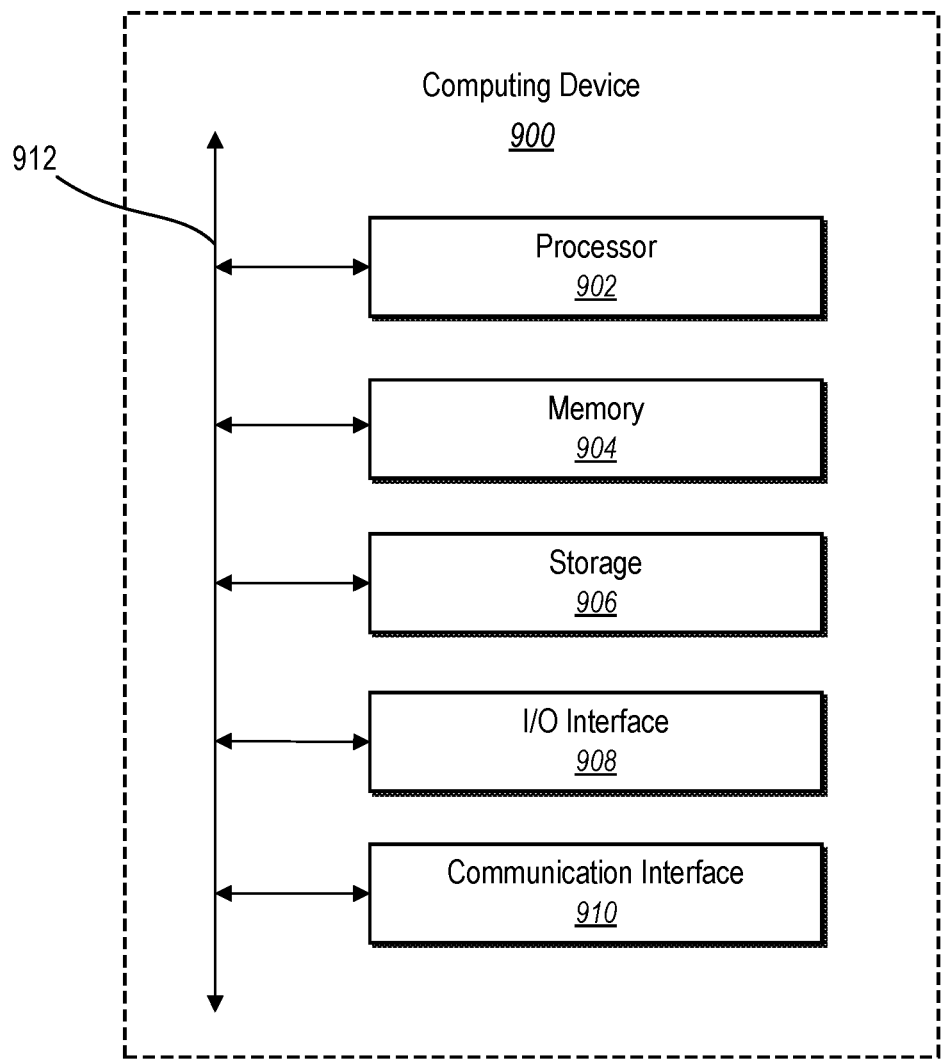
FIG. 9 illustrates a block diagram of a computing device in accordance with one or more embodiments described herein.

FIG. 9 illustrates a block diagram of exemplary computing device 900 that may be configured to perform one or more of the processes described above. One will appreciate that the computing device 900 may represent one or more client devices or server devices, such as those described previously. Further, the computing device 900 may represent various types of computing devices. For example, the computing device 900 can include: a mobile device such as a mobile telephone, a smartphone, a PDA, a tablet, a laptop; a non-mobile device such as a desktop or server; or any other type of computing device.

As shown by FIG. 9, the computing device 900 can comprise a processor 902, a memory 904, a storage device 906, an input/output ("I/O") interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9.

In one or more embodiments, the processor 902 includes hardware for executing instructions, such as those making up a computer program. The memory 904 may be used for storing data, metadata, and programs for execution by the processor(s). The storage device 906 includes storage for storing data or instructions.

The I/O interface 908 allows a user (e.g., content producer or viewer) to provide input to, receive output from, and otherwise transfer data to and receive data from computing device 900. The I/O interface 908 may include a mouse, a keypad or a keyboard, a touchscreen, a camera, an optical scanner, network interface, modem, other known I/O devices or a combination of such I/O interfaces. The I/O interface 908 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, the communication interface 910 may include a network interface controller (NIC) or network adapter for communicating with an Ethernet or other wire-based network or a wireless NIC (WNIC) or wireless adapter for communicating with a wireless network, such as a WI-FI. The communication infrastructure 912 may include hardware, software, or both that couples components of the computing device 900 to each other. As an example, the communication infrastructure 912 may include one or more types of buses.

As mentioned above, embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor receives instructions, from a non-transitory computer-readable medium, (e.g., memory, etc.), and executes those instructions, thereby performing one or more processes, including one or more of the processes described herein.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which, when executed by a processor, cause a general-purpose computer, a special-purpose computer, or a special-purpose processing device to perform a certain function or group of functions. In some embodiments, a general-purpose computer executes computer-executable instructions, which turns the general-purpose computer into a special-purpose computer implementing elements of the disclosure.

Those skilled in the art will appreciate that the disclosure may be practiced in network computing environments with many types of computer system configurations. The disclosure may also be practiced in distributed system environments where local and remote computer systems, which are linked through a network, both perform tasks. Embodiments of the present disclosure can also be implemented in cloud computing environments. In this description, "cloud computing" is defined as a model for enabling on-demand network access to a shared pool of configurable computing resources.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 10:
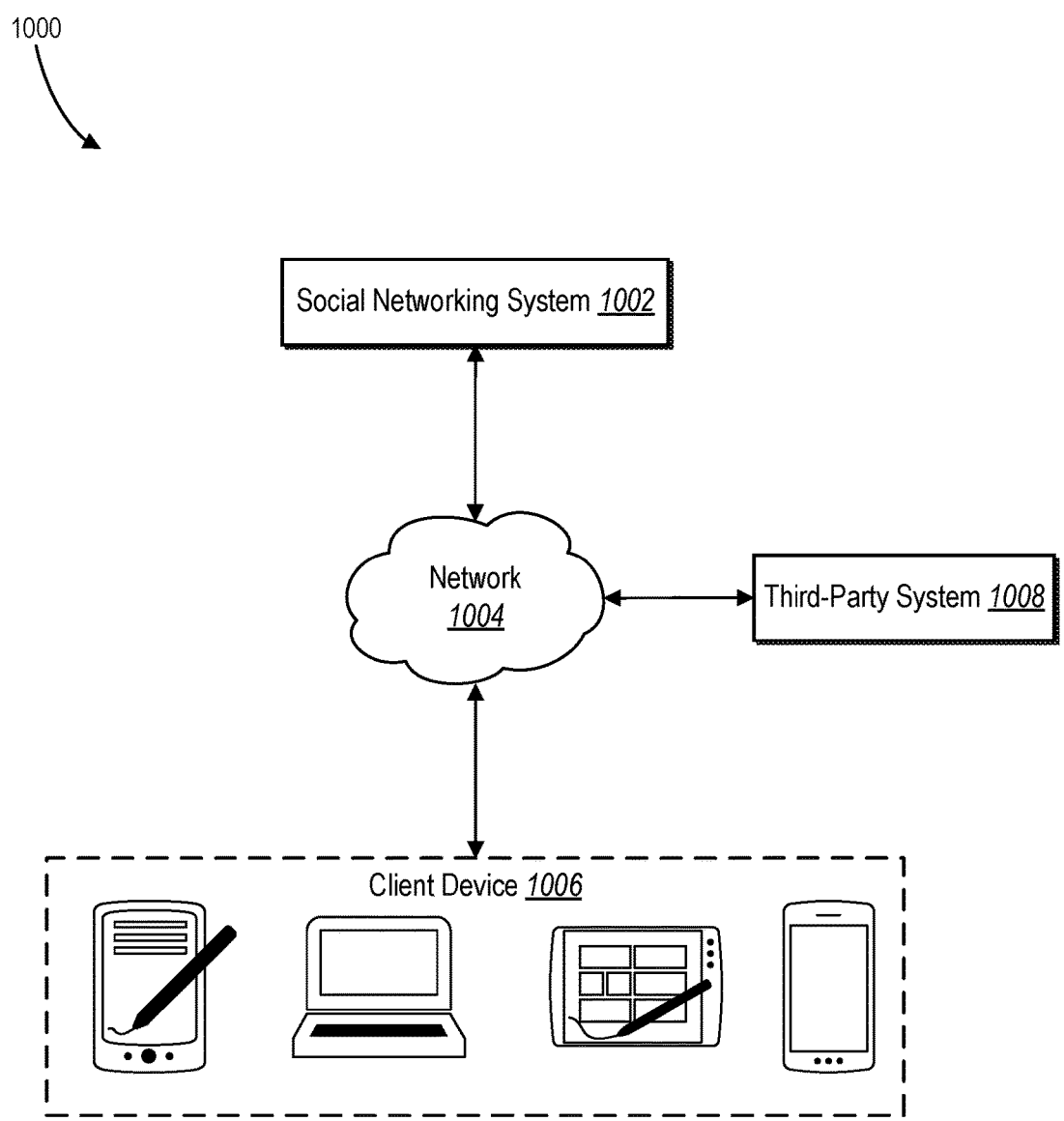
FIG. 10 illustrates a network environment of a social networking system in accordance with one or more embodiments described herein.

FIG. 10 illustrates an example network environment 1000 of a social networking system. The network environment 1000 includes a client device 1006, a social networking system 1002, and a third-party system 1008 connected to each other by a network 1004. Although FIG. 10 illustrates a particular arrangement of client device 1006, the social networking system 1002, the third-party system 1008, and the network 1004, this disclosure contemplates any suitable arrangement and number of client device 1006, the social networking system 1002, the third-party system 1008, and the network 1004.

Links may connect the client device 1006, the social networking system 1002, and the third-party system 1008 to the network 1004 or to each other. Links need not necessarily be the same throughout network environment 1000. One or more first links may differ in one or more respects from one or more second links.

In some embodiments, the client device 1006 may be an electronic device including hardware, software, or embedded logic components or a combination of two or more such components and capable of carrying out the appropriate functionalities implemented or supported by the client device 1006. As an example, a client device 1006 may include any of the computing devices discussed above in relation to FIG. 10. The client device 1006 may enable a network user at the client device 1006 to access the network 1004. The client device 1006 may enable its user to communicate with other users at other client devices or systems.

In some embodiments, the client device 1006 may include a web browser, such as and may have one or more add-ons, plug-ins, or other extensions. The client device 1006 may render a webpage based on the HTML, files from the server for presentation to the user.

In some embodiments, the social networking system 1002 may be a network-addressable computing system that can host an online social network. The social networking system 1002 may generate, store, receive, and send social-networking data, such as, for example, user-profile data, concept-profile data, the social-graph information, or other suitable data related to the online social network. The social networking system 1002 may be accessed by the other components of the network environment 1000 either directly or via the network 1004.

In some embodiments, the social networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, etc., or any combination thereof.

In some embodiments, the social networking system 1002 may include one or more data stores. Data stores may be used to store various types of information. In some embodiments, the information stored in data stores may be organized according to specific data structures. Particular embodiments may provide interfaces that enable the client device 1006, the social networking system 1002, or the third-party system 1008 to manage, retrieve, modify, add, or delete, the information stored in data stores.

In some embodiments, the social networking system 1002 may store one or more social graph, described below. In one or more embodiments, the social networking system 1002 may provide users with the ability to take actions on various types of items or objects, supported by social networking system 1002. As an example, the items and objects may include groups or social networks to which users of the social networking system 1002 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 1002 or by an external system of the third-party system 1008, which is separate from the social networking system 1002 and coupled to the social networking system 1002 via the network 1004.

The social networking system 1002 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action-logging manager may be used to receive communications from a web server about a user's actions on or off the social networking system 1002. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 1002. A privacy setting of a user determines how particular information associated with a user can be shared. The authorization server may allow users to opt in to or opt out of having their actions logged by the social networking system 1002 or shared with other systems (e.g., the third-party system 1008), such as, for example, by setting appropriate privacy settings.

In some embodiments, the third-party system 1008 may include one or more types of servers, one or more data stores, one or more interfaces, including but not limited to APIs, one or more web services, one or more content sources, one or more networks, or any other suitable components. The third-party system 1008 may be operated by a different entity from an entity operating the social networking system 1002 even if, in some embodiments, the social networking system 1002 and the third-party systems 1008 operate in conjunction with each other. In this sense, the social networking system 1002 may provide a platform, or backbone, which other systems, such as the third-party systems 1008, may use to provide social-networking services and functionality to users across the Internet.

In some embodiments, a third-party system 1008 may include a third-party content object provider. A third-party content object provider may include one or more sources of content objects, which may be communicated to the client device 1006. As an example, content objects may include information regarding things or activities of interest to the user. As another example, content objects may include incentive content objects.

Figure 11:
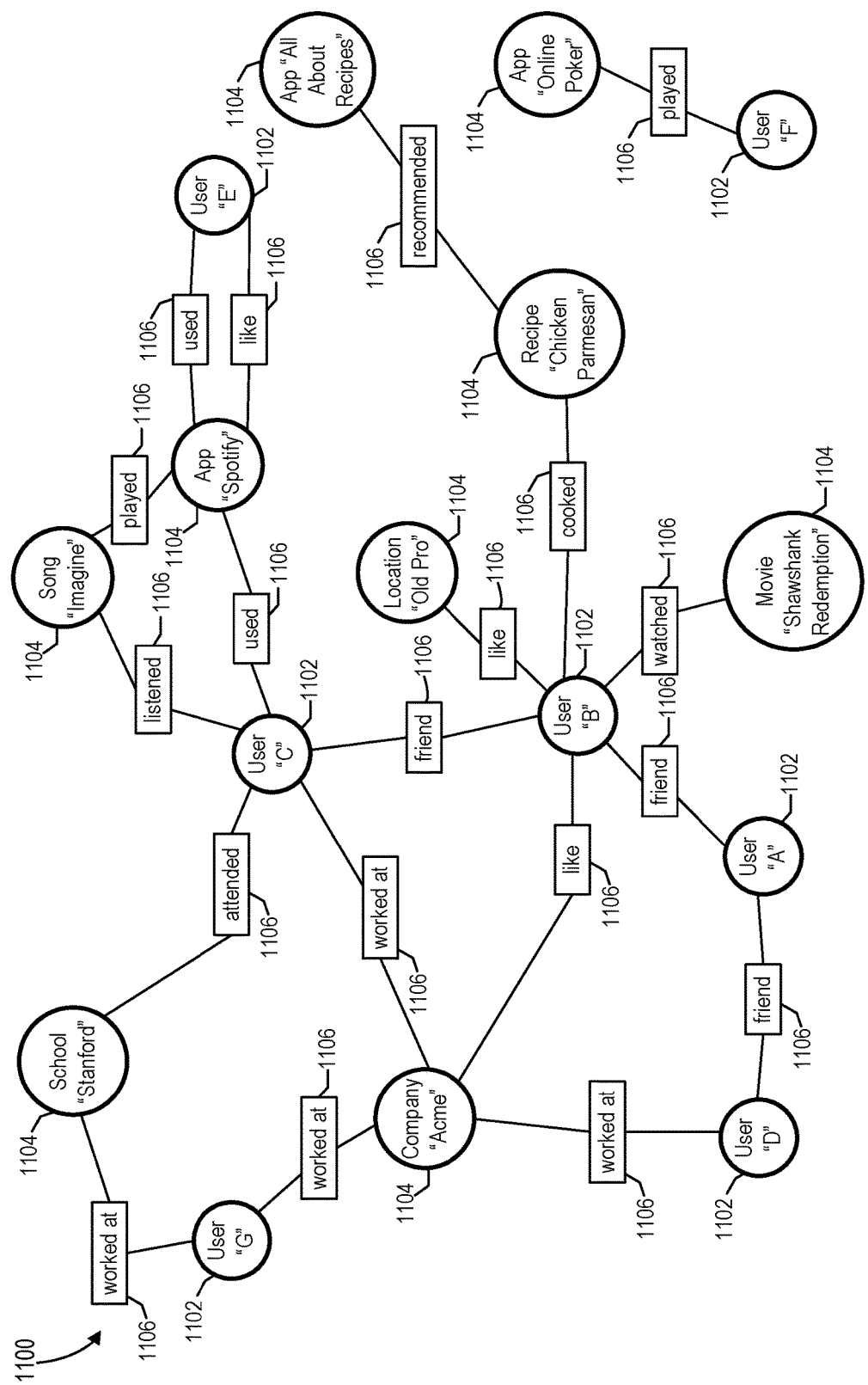
FIG. 11 illustrates an example social graph of a social networking system in accordance with one or more embodiments described herein.

FIG. 11 illustrates an example social graph 1100. In some embodiments, the social networking system 1002 may store one or more social graphs 1100 in one or more data stores. In some embodiments, the social graph 1100 may include multiple nodes—which may include multiple user nodes or multiple concept nodes—and multiple edges 1106 connecting the nodes. The social graph 1100 illustrated in FIG. 11 is shown, for didactic purposes, in a two-dimensional visual map representation.

In some embodiments, a user node 1102 may correspond to a user of social networking system 1002. When a user registers for an account with social networking system 1002, the social networking system 1002 may create a user node 1102 corresponding to the user, and store the user node 1102 in one or more data stores. Users and user nodes described herein may, where appropriate, refer to registered users and user nodes associated with registered users.

In some embodiments, a concept node 1104 may correspond to a concept. As an example, a concept may correspond to a place, a website, an entity, a resource, etc. A concept may be located within social networking system 1002 or on an external server. A concept node 1104 may be associated with information of a concept provided by a user or information gathered by various systems, including the social networking system 1002.

In some embodiments, a node in social graph 1100 may represent or be represented by an online profile page. Profile pages may be hosted by or accessible to social networking system 1002. Profile pages may be viewable by all or a selected subset of other users. As an example, a user node 1102 may have a corresponding user-profile page where the corresponding user may add content, make declarations, or otherwise express him or herself. As another example, a concept node 1104 may have a corresponding concept-profile page in which one or more users may add content, make declarations, or express themselves, particularly in relation to the concept corresponding to concept node 1104.

As an example, an edge 1106 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships.

In some embodiments, a pair of nodes in social graph 1100 may be connected to each other by one or more edges 1106. An edge 1106 connecting a pair of nodes may represent a relationship between the pair of nodes. In some embodiments, an edge 1106 may include or represent one or more data objects or attributes corresponding to the relationship between a pair of nodes. As an example, a first user may indicate that a second user is a "friend" of the first user. In response to this indication, the social networking system 1002 may send a "friend request" to the second user. If the second user confirms the "friend request," the social networking system 1002 may create an edge 1106 connecting the first user's user node 1102 to the second user's user node 1102 in social graph 1100 and store edge 1106 as social-graph information in one or more of data stores.

In some embodiments, an edge 1106 between a user node 1102 and a concept node 1104 may represent a particular action or activity performed by a user associated the with the user node 1102 toward a concept associated with the concept node 1104. As an example, as illustrated in FIG. 11, a user may "liked," "attended," "played," "listened," "cooked," "worked at," or "watched" a concept, each of which may correspond to an edge type or subtype.

In some embodiments, the social networking system 1002, the client device 1006, or the third-party system 1008 may access the social graph 1100 and related social-graph information for suitable applications. The nodes and edges of social graph 1100 may be stored as data objects, for example, in a data store (such as a social-graph database).

Such a data store may include one or more searchable or queryable indexes of nodes or edges of social graph 1100.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news feed or ticker item on the social networking system 1002).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 1002 who has taken an action associated with the subject matter of the advertisement.

In some embodiments, the social networking system 1002 may determine the social-graph affinity (herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity.

In some embodiments, the social networking system 1002 may measure or quantify social-graph affinity using an affinity coefficient (herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 1002 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 1002 may determine coefficients using machine-learning algorithms trained on historical actions and past user responses, or data farmed from users by exposing them to various options and measuring responses.

In some embodiments, the social networking system 1002 may calculate a coefficient based on a user's actions. The social networking system 1002 may monitor such actions on the online social network, on the third-party system 1008, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 1002 may calculate a coefficient based on the user's actions with particular types of content. The content may be associated with the online social network, the third-party system 1008, or another suitable system. The social networking system 1002 may analyze a user's actions to determine whether one or more of the actions indicate an affinity for subject matter, content, other users, and so forth.

In some embodiments, the social networking system 1002 may calculate a coefficient based on the type of relationship between particular objects. Referencing the social graph 1100, the social networking system 1002 may analyze the number and/or type of edges 1106 connecting particular user nodes and concept nodes 1104 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 1100.

In some embodiments, the social networking system 1002 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1006 of the user). A first user may be more interested in other users or concepts that are closer to the first user. As an example, if a user is one mile from an airport and two miles from a gas station, the social networking system 1002 may determine that the user has a higher coefficient for the airport than the gas station based on the proximity of the airport to the user.

In some embodiments, the social networking system 1002 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 1002 may provide information that is relevant to user's interests and current circumstances, increasing the likelihood that they will find such information of interest.

In some embodiments, the social networking system 1002 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 10/503093, filed Aug. 10, 2006, U.S. patent application Ser. No. 11/977027, filed Dec. 22, 2010, U.S. patent application Ser. No. 11/978265, filed Dec. 23, 2010, and U.S. patent application Ser. No. 13/632869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 1002 may send a request to the data store for the object. The request may identify the user associated with the request and may be sent to the user (or the client device 1006 of the user) if the authorization server determines that the user is authorized to access the object based on the privacy settings associated with the object, but not otherwise.

The preceding specification is described with reference to specific exemplary embodiments thereof. The description above and drawings are illustrative and are not to be construed as limiting. The additional or alternative embodiments may be embodied in other specific forms without departing from its spirit or essential characteristics. The scope of the invention is, therefore, indicated by the appended claims rather than by the preceding description. All changes that come within the meaning and range of equivalency of the claims are to be embraced within their scope.

What is claimed is:

1. A method comprising:
   storing a plurality of images of users of a networking system in an image database;
   determining facial features of one or more users of the networking system in each image of the plurality of images, the facial features comprising high-level facial features and lower-level facial features;
   generating, for each image of the plurality of images, a facial attribute data vector based on the determined facial features, wherein each facial attribute data vector comprises a first vector portion corresponding to the high-level facial features and a second vector portion corresponding to the lower-level facial features;
   identifying a first image of a first user of the networking system;
   determining a first facial attribute data vector for the first image, the first facial attribute data vector comprising a high-level portion corresponding to high-level facial features of the first user and a lower-level portion corresponding to lower-level facial features of the first user;
   identifying, from the plurality of images, a subset of images by:
      comparing the first vector portions from the facial attribute data vectors of the plurality of images to the high-level portion of the first facial attribute data vector of the first image; and
      excluding images from the plurality of images not sharing one or more high-level facial features with the first image based on the comparing;
   determining, by at least one processor and from the identified subset of images, one or more images comprising one or more other users of the networking system having a facial resemblance to the first user by comparing the second vector portions from the facial attribute data vectors of the identified subset of images to the lower-level portion from the first facial attribute data vector of the first image; and
   providing, to the first user and via the networking system, one or more options for engaging with the one or more other users of the networking system having a facial resemblance to the first user.

2. The method of claim 1, wherein each facial attribute data vector is generated in n-dimensional space where n corresponds to a number of the facial features represented by each facial attribute data vector.

3. The method of claim 1, further comprising determining, for each of the one or more other users of the networking system, a lower-level facial features resemblance score relative to the first user.

4. The method of claim 3, further comprising determining that the one or more lower-level facial features resemblance scores determined for the one or more other users of the networking system satisfy a minimum lower-level facial features threshold value.

5. The method of claim 1, wherein one or more lower-level facial features of the lower-level facial features of the first user comprise one or more measured distances between a plurality of points within the first image of the first user.

6. The method of claim 1, further comprising utilizing a facial attribute machine learning model that comprises principle component analysis to determine the facial attribute data vectors.

7. The method of claim 1, further comprising:
receiving, from the first user, validation that the one or more images of the one or more other users of the networking system have a facial resemblance to the first user;
modifying a facial resemblance matching machine learning model based on the validation;
identifying, based on the modified facial resemblance matching machine learning model, one or more additional images from the plurality of images of one or more additional users that have a facial resemblance to the first user; and
providing one or more options for engaging with the one or more additional users having a facial resemblance to the first user.

8. The method of claim 1, wherein the first facial attribute data vector is determined for the first user from the first image and a second image of the first user.

9. The method of claim 8, wherein determining the first facial attribute data vector for the first user from the first image and the second image of the first user comprises combining a second facial attribute data vector determined for the first image of the first user with a third facial attribute data vector determined for the second image of the first user.

10. The method of claim 1, further comprising:
determining, for each of the one or more other users having a facial resemblance to the first user, a commonality score with the first user; and
ranking a presentation of the one or more other users based on the commonality scores.

11. The method of claim 1, further comprising disqualifying a second user from the one or more other users having a facial resemblance to the first user based on the second user being within a social threshold degree of separation to the first user.

12. A system comprising:
at least one processor; and
at least one non-transitory computer-readable storage medium storing instructions that, when executed by the at least one processor, cause the system to:
store a plurality of images of users of a networking system in an image database;
determine facial features of one or more users of the networking system in each image of the plurality of images, the facial features comprising high-level facial features and lower-level facial features;
generate, for each image of the plurality of images, a facial attribute data vector based on the determined facial features, wherein each facial attribute data vector comprises a first vector portion corresponding to the high-level facial features and a second vector portion corresponding to the lower-level facial features;
identify a first image of a first user of the networking system;
determine a first facial attribute data vector for the first image, the first facial attribute data vector comprising a high-level portion corresponding to high-level facial features of the first user and a lower-level portion corresponding to lower-level facial features of the first user;
identify, from the plurality of images, a subset of images by:
compare the first vector portions from the facial attribute data vectors of the plurality of images to the high-level portion of the first facial attribute data vector of the first image; and
exclude images from the plurality of images not sharing one or more high-level facial features with the first image based on the comparing;
determine, by at least one processor and from the identified subset of images, one or more images comprising one or more other users of the networking system having a facial resemblance to the first user by comparing the second vector portions from the facial attribute data vectors of the identified subset of images to the lower-level portion from the first facial attribute data vector of the first image; and
provide, to the first user and via the networking system, one or more options for engaging with the one or more other users of the networking system having a facial resemblance to the first user.

13. The system of claim 12, further comprising instructions that, when executed by the at least one processor, cause the system to:
determine, for each of the one or more other users having a facial resemblance to the first user, a commonality score with the first user; and
rank a presentation of the one or more other users based on the commonality scores.

14. The system of claim 12, further comprising instructions that, when executed by the at least one processor, cause the system to utilize a facial attribute machine learning model that comprises principle component analysis to determine the facial attribute data vectors.

15. The system of claim 12, further comprising instructions that, when executed by the at least one processor, cause the system to:
receive, from the first user, validation that the one or more images of the one or more other users of the networking system have a facial resemblance to the first user;
modify a facial resemblance matching machine learning model based on the validation;
identify, based on the modified facial resemblance matching machine learning model, one or more additional images from the plurality of images of one or more additional users that have a facial resemblance to the first user; and
provide one or more options for engaging with the one or more additional users having a facial resemblance to the first user.

16. A non-transitory computer-readable medium storing instructions that, when executed by at least one processor, cause a computer system to:
- store a plurality of images of users of a networking system in an image database;
- determine facial features of one or more users of the networking system in each image of the plurality of images, the facial features comprising high-level facial features and lower-level facial features;
- generate, for each image of the plurality of images, a facial attribute data vector based on the determined facial features, wherein each facial attribute data vector comprises a first vector portion corresponding to the high-level facial features and a second vector portion corresponding to the lower-level facial features;
- identify a first image of a first user of the networking system;
- determine a first facial attribute data vector for the first image, the first facial attribute data vector comprising a high-level portion corresponding to high-level facial features of the first user and a lower-level portion corresponding to lower-level facial features of the first user;
- identify, from the plurality of images, a subset of images by:
  - compare the first vector portions from the facial attribute data vectors of the plurality of images to the high-level portion of the first facial attribute data vector of the first image; and
  - exclude images from the plurality of images not sharing one or more high-level facial features with the first image based on the comparing;
- determine, by at least one processor and from the identified subset of images, one or more images comprising one or more other users of the networking system having a facial resemblance to the first user by comparing the second vector portions from the facial attribute data vectors of the identified subset of images to the lower-level portion from the first facial attribute data vector of the first image; and
- provide, to the first user and via the networking system, one or more options for engaging with the one or more other users of the networking system having a facial resemblance to the first user.

17. The computer-readable medium of claim 16, wherein the instructions cause the computer system to identify the first image from the image database.

18. The computer-readable medium of claim 16, further comprising instructions that, when executed by at least one processor, cause the computer system to receive the first image from a client device; and
wherein determining the first facial attribute data vector for the first image comprises generating the first facial attribute data vector from the first image.

19. The computer-readable medium of claim 16, wherein the facial first attribute data vector is determined for the first user from the first image of the user and a second image of the first user.

20. The computer-readable medium of claim 16, wherein each facial attribute data vector is generated in n-dimensional space where n corresponds to a number of the facial features represented by each facial attribute data vector.

* * * * *